(12) United States Patent
Denolf

(10) Patent No.: US 8,275,047 B2
(45) Date of Patent: Sep. 25, 2012

(54) METHOD AND DEVICE FOR BLOCK-BASED CONDITIONAL MOTION COMPENSATION

(75) Inventor: Kristof Denolf, Ghent (BE)

(73) Assignee: Xilinx, Inc., San Jose, CA (US)

( * ) Notice: Subject to any disclaimer, the term of this patent is extended or adjusted under 35 U.S.C. 154(b) by 2567 days.

(21) Appl. No.: 10/251,688

(22) Filed: Sep. 19, 2002

(65) Prior Publication Data

US 2003/0152149 A1  Aug. 14, 2003

Related U.S. Application Data

(60) Provisional application No. 60/323,881, filed on Sep. 20, 2001.

(51) Int. Cl.
  *H04N 7/12* (2006.01)
  *H04N 11/02* (2006.01)
  *H04N 11/04* (2006.01)
  *H04B 1/66* (2006.01)
(52) U.S. Cl. ................................. 375/240.25
(58) Field of Classification Search ............ 375/240.08, 375/240.12–240.16, 240.24, 240.25, 240.27; 382/236, 238; 709/215; *H04N 7/12*
See application file for complete search history.

(56) References Cited

U.S. PATENT DOCUMENTS

| 5,208,673 | A |   | 5/1993  | Boyce              |            |
|-----------|---|---|---------|--------------------|------------|
| 5,630,033 | A |   | 5/1997  | Purcell et al.     |            |
| 5,717,462 | A | * | 2/1998  | Hayashi            | 375/240.13 |
| 5,731,850 | A | * | 3/1998  | Maturi et al.      | 348/699    |
| 5,761,423 | A | * | 6/1998  | Lee                | 709/215    |
| 5,815,206 | A | * | 9/1998  | Malladi et al.     | 375/240.01 |
| 6,028,631 | A |   | 2/2000  | Nakaya et al.      |            |
| 6,028,635 | A | * | 2/2000  | Owen et al.        | 375/240.18 |
| 6,088,047 | A | * | 7/2000  | Bose et al.        | 345/547    |
| 6,108,449 | A | * | 8/2000  | Sekiguchi et al.   | 382/236    |
| 6,418,166 | B1| * | 7/2002  | Wu et al.          | 375/240.12 |
| 6,483,874 | B1| * | 11/2002 | Panusopone et al.  | 375/240.08 |
| 6,690,835 | B1|   | 2/2004  | Brockmeyer et al.  |            |
| 6,763,071 | B1| * | 7/2004  | Maeda et al.       | 375/240.25 |
| 6,862,320 | B1| * | 3/2005  | Isu et al.         | 375/240.27 |

(Continued)

FOREIGN PATENT DOCUMENTS

EP    0 698 861 A1    2/1996

(Continued)

OTHER PUBLICATIONS

Nachtergaele, et al., "Low-power data transfer and storage exploration for H.263 video decoder system", IEEE Journal on Selected Areas in Communications, vol. 16, No. 1, p. 120-129, (Jan. 1998).

(Continued)

*Primary Examiner* — Nhon Diep
(74) *Attorney, Agent, or Firm* — Knobbe Martens Olson & Bear LLP; Thomas George

(57) ABSTRACT

Methods and devices for encoding and decoding video data are provided, wherein an image data structure can be represented as a group of macroblocks and each macroblock contains a plurality of blocks. One inventive aspect includes a method of decoding image data comprises decoding a current block of data, comprising retrieving a related reference block, decoding texture information of the current block, and reconstructing the current block, prior to the decoding of another block of data.

17 Claims, 23 Drawing Sheets

U.S. PATENT DOCUMENTS

2001/0005432 A1* 6/2001 Takahashi et al. ....... 375/240.08

FOREIGN PATENT DOCUMENTS

EP 0 848 558 A1 6/1998

OTHER PUBLICATIONS

Nachtergaele, et al., "Power and speed-efficient code transformation of video compression algorithms for RISC processors" Kluwer Journal on VLSI Signal Processing, XX, p. 1-9, (2000).

Nachtergaele, et al., "System-level power optimization of video codecs on embedded cores: a systematic approach", Kluwer Journal on VLSI Signal Processing, 18, p. 89-109, (1998).

De Greef et al., Mapping real-time motion estimation type algorithms to memory efficient, programmable multi-processor architectures, Microprocessing and Microprogramming 41 (1995) 409-423.

IEEE workshop on VLSI signal processing, La Jolla, CA, Oct. 1994, "Global communication and memory optimizing transformation for low power signal processing systems," Catthoor et al., 12 pages.

IEEE Journal of Solid-State Circuits, vol. 31, No. 9, Sep. 1996, "Energy Dissipation in General Purpose Microprocessors," Gonzalez et al., pp. 1277-1283.

Proceedings of the IEEE, vol. 83, No. 2, Feb. 1995, "VLSI Architectures for Video Compression—A Survey," Pirsch, et al., pp. 220-246.

IEEE Transactions on Circuits and Systems for Video Technology, vol. 6, No. 1, Feb. 1996, "Architecture and Applications of the HiPAR Video Signal Processor," Ronner et al., pp. 56-66.

IEEE Workshop on VLSI signal processing, Monterey, CA, Oct. 1996, "Low Power Storage Exploration for H.263 Video Decoder," Nachtergaele et al., 12 pages.

In a paper collection on Low Power CMOS design, IEEE Press, pp. 609-618, "System-level transformation for low power data transfer and storage," Catthoor et al., pp. 1-8.

Proc. IEEE Intnl. Symp. On Low Power Design, Monterey, Aug. 1996 "Power Exploration for Data Dominated Video Applications," Wuytack et al., pp. 359-364.

IEEE Transactions on Circuits and Systems for Video Technology, vol. 7, No. 1, Feb. 1997, "The MPEG-4 Video Standard Verification Model," Thomas Sikora, pp. 19-31.

Diguet et al., Formalized methodology for data reuse exploration in hierarchical memory mappings, *Proceeding 1997 International Symposium on Low Power Electronics and Design*, Monterey, CA USA, Aug. 18-20, 1997 pp. 30-35.

European Search Report; Application No. EP 99 10 4301.

* cited by examiner

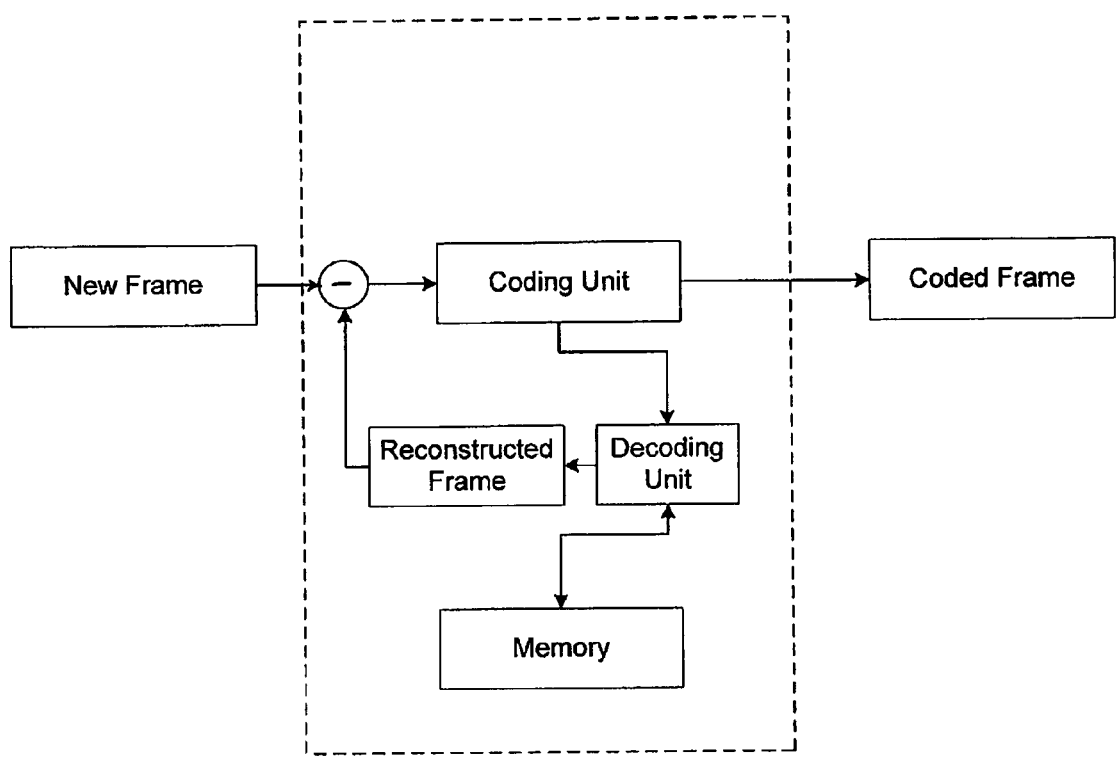
FIGURE 23: Structure of a video coder

METHOD AND DEVICE FOR BLOCK-BASED CONDITIONAL MOTION COMPENSATION

CROSS REFERENCE TO RELATED APPLICATION

This application claims priority, under 35 U.S.C. §119(e), to U.S. Provisional Patent Application No. 60/323,881 entitled "BLOCK-BASED CONDITIONAL MOTION COMPENSATION METHODS AND DEVICES" and filed on Sep. 20, 2001. The disclosure of the above-described filed application is hereby incorporated by reference in its entirety.

BACKGROUND OF THE INVENTION

1. Field of the Invention

The invention pertains to the field of video encoding and decoding. More particularly, the invention pertains to methods of video encoding and decoding employing motion compensation and devices adapted to execute such methods.

2. Description of the Related Technology

An MPEG-4 video decoder is a block-based algorithm exploiting temporal and spatial redundancy in subsequent frames. A bitstream, or sequence of bits representing the coded video sequences, is received as input, and the bitstream is compliant with the ISO/IEC 14496-2 standard. The bitstream starts with identifying the visual object as a video object. This video object can be coded in multiple layers (scalability). One layer consists of Visual Object Planes (VOPs), time instances of a visual object (i.e. frame).

A decompressed VOP is represented by a group of MacroBlocks (MBs). Each MB contains six blocks of 8×8 pixels: 4 luminance (Y), 1 chrominance red (Cr) and 1 chrominance blue (Cb) blocks. FIG. 1 illustrates the macroblock structure in 4:2:0 format (the chrominance components are downsampled in horizontal and vertical direction).

Two compression techniques are discriminated. In an intra case, the MB or VOP is coded on itself using an algorithm that reduces the spatial redundancy. In contrast, inter coding relates a macroblock of the current VOP to MBs to previously reconstructed VOPs and thereby reduces the temporal redundancy.

FIG. 2 is a block diagram of a simple profile video decoder, supporting rectangular intra coded (I) and predictive coded (P) VOPs. An I VOP (intra coded VOP) contains only independent texture information (only intra MBs). A P-VOP (predictive coded VOP) is coded using motion compensated prediction from the previous P or I VOP, which can contain intra or inter MBs.

Reconstructing a P VOP implies adding a motion compensated VOP and a texture decoded error VOP. In operation, the video decoder of FIG. 2 receives a bitstream, which is split into coded motion vector information and coded texture information by a demultiplexer. FIG. 2 illustrates performance of texture decoding of a complete VOP, motion compensation at VOP level, and reconstruction at VOP level by the decoder, each of which will be discussed in more detail hereinafter.

Note that all macroblocks must be intra refreshed periodically to avoid the accumulation of numerical errors. This intra refresh can be implemented asynchronously among macroblocks.

Motion Compensation

A video sequence typically has a high temporal correlation between similar locations in neighboring images (VOPs). Inter coding (or predictive coding) tracks the position of a macroblock from VOP to VOP to reduce the temporal redundancy. The motion estimation process tries to locate the corresponding macroblocks among VOPs. MPEG-4 only supports the translatory motion model.

The top left corner pixel coordinates (x, y) can be used to specify the location of a macroblock. The search for a matching block is restricted to a region around the original location of the MB in the current picture, maximally this search area consists of 9 MBs. In identifying (x+u, y+v) as the location of the best matching block in the reference, the motion vector equals to (u, v). In backward motion estimation, the reference VOP is situated in time before the current VOP, as opposed to forward motion estimation where the reference VOP comes later in time.

As the true VOP-to-VOP displacements are unrelated to the sampling grid, a prediction at a finer resolution can improve the compression. MPEG-4 allows motion vectors with half pixel accuracy, estimated through interpolation of the reference VOP. Such vectors are called half pel motion vectors.

Typically, a macroblock of a P VOP is only inter coded if an acceptable match in the reference VOP was found by the motion estimation (else, it is intra coded). Motion compensation uses the motion vector to locate the related macroblock in the previously reconstructed VOP. This motion vector information is exploited for retrieving information of a previously reconstructed VOP, assumed to be available at the decoder already. The difference between the related macroblock MB(x+u, y+v, t−1) and the current macroblock MB(x, y, t) is the prediction error e(x, y, t). The prediction error can be coded using the following texture algorithm:

$$e(x,y,t)=MB(x,y,t)-MB(x+u,y+v,t-1) \quad (1)$$

Reconstructing an inter MB implies decoding of the motion vector, motion compensation, decoding the error, and adding the motion compensated and the error MB to obtain the reconstructed macroblock.

Texture Decoding Process

The texture decoding process (FIG. 2) is block-based and comprises four steps: Variable Length Decoding (VLD), inverse scan, inverse DC & AC prediction, inverse quantization and an Inverse Discrete Cosine Transform (IDCT).

The VLD algorithm extracts code words from Huffman tables, resulting in a 8×8 array of quantized DCT coefficients. Then, the inverse scan reorganizes the positions of those coefficients in the block. In case of an intra macroblock, inverse DC & AC prediction adds the prediction value of the surrounding blocks to the obtained value. This is followed by saturation in the range [−2048,2047]. Note that this saturation is unnecessary for an inter MB. Because no DC & AC prediction is used, the inter MB DCT coefficients are immediately in the correct range.

Inverse quantization, basically a scalar multiplication by the quantizer step size, yields the reconstructed DCT (Discrete Cosine Transform) coefficients. These coefficients are saturated in the range $[-2^{bitsPerPixel+3}, 2^{bitsPerPixel+3}-1]$. In the final step, the IDCT transforms the coefficients to the spatial domain and outputs the reconstructed block. These values are saturated in the range $[-2^{bitsPerPixel}, 2^{bitsPerPixel}-1]$.

Thus, the decoded texture information comprises error texture information. The error texture information is added to the motion compensated previous VOP information, and the current VOP is thereby reconstructed.

Error Resilience

The use of variable length coding makes the (video) bitstreams particularly sensitive to channel errors. A loss of bits typically leads to an incorrect number of bits being VLC decoded and causes loss of synchronization. Moreover, the location where the error is detected is not the same as where the error occurs. Once an error occurs, all data until the next resynchronization point has to be discarded. The amount of lost data can be minimized through the use of error resilience tools: resynchronization markers, data partitioning, header extension and reversible variable length codes.

Optimization of video decoders using a MB based approach is discussed in the following references, each of which is hereby incorporated by reference in its entirety.

L. Nachtergaele, et al., "Low Power Data Transfer and Storage Exploration for H.263 Video Decoder System", IEEE Journal on Selected areas in Communications, Special issue on Very Low Bit-Rate Video Coding Vol. 16, No. 1, pp. 120-129, January 1998.

L. Nachtergaele, et al., "System-Level power optimization of Video Codecs on Embedded Cores: a Systematic Approach", Journal of VLSI Signal Processing, Kluwer, Vol. 18, No. 2, pp. 89-111, Boston, February 1998.

L. Nachtergaele, et al., "Power and speed-efficient code transformation of video compression algorithms for RISC processors", to appear in Journal of VLSI Signal Processing, Kluwer Vol. 27, pp 161-169, Boston, February 2001.

It is the aim of the invention to provide a power consumption optimized video coder (encoder and decoder).

SUMMARY OF CERTAIN INVENTIVE EMBODIMENTS

The video coding methods of the present invention have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Invention" one will understand how the features of this invention provide advantages.

The invention relates to video coding methods wherein the images of a video sequence are represented by data structures with a two-level hierarchical structure, similar to a MPEG-4 stream. An image data structure can be represented as a group of MacroBlocks (MBs), wherein each MB contains a plurality of blocks of pixels, each MB having a plurality of luminance blocks, and at least one chrominance block. The video coding methods can be characterized in that a part of the data of one data structure of the sequence is mapped within predefined similarity criteria (for example, mean square error between pixel values) to a part of the data of another reference data structure of the sequence, wherein the mapping can be based on a translation model, for example. The coding method exploits the similarity criteria by coding the difference between the data structure parts up to the mapping. The related decoding methods perform these operations in reverse.

It is one aspect of the invention to provide decoding methods, related to similarity exploiting coding methods, which loops over the blocks. More specifically, for each of the MB's of the image data structure, decoding of the current block, including retrieving the related reference block, decoding the (error) texture information of the current block and finally reconstructing the current block, is performed before another block of the same MB is considered (FIG. 22).

Written in pseudo-code, one embodiment of the invention can be understood as operating as follows:

```
For each image data structure
    For each MB of said image data structure
        For each block of said MB
            Performing decoding of a block, including
                retrieving a reference block, decoding
                texture information of the block, and
                reconstructing said block;
        End_block loop;
    End_MB loop;
End_image data structure loop;
```

A video bitstream comprises motion vectors and texture data in blocks of a macroblock, wherein each of the blocks in a macroblock carries additional information indicating whether a texture block or macroblock contains information. The additional information of a block or macroblock in an inter coded block or macroblock can indicate that all pixel values (coefficients) are zero.

In a second aspect of the invention, the execution of the motion compensation based decoding of a block can explicitly exploit the additional information for determining whether and how motion compensation based decoding is to be executed.

In the event a block of an inter macroblock has a zero motion vector, and if it can be derived from the additional information that the texture block consists completely of zeros, or if the corresponding macroblock has a zero motion vector and if it can be derived from the additional information that the macroblock consists of zero values only, then nothing has to be done, as the correct block is still in the frame memory.

If for blocks in an inter MB, the additional information indicates that all pixel values are zero, no operations on these pixel values have to be computed, as the result is a block filled with zeros. In the case of a not coded block having a non-zero motion vector, the motion compensated block can be moved to the frame memory without clipping. Since no addition occurred the elements are still in the correct range.

This aspect of the invention can be characterized in pseudo-code as follows:

```
For each image data structure
    For each MB of said image data structure
        For each block of said MB
            If error information of a block is zero and motion
            vector non-zero
                performing decoding of a
                block, including steps of:
                    retrieving a reference block,
            If error information of a block is not zero,
                performing decoding of a block, including
                steps of:
                    retrieving a reference block,
                    decoding texture information of the block;
                    and reconstructing said block;
        End_block loop;
    End_MB loop;
End_image data structure loop;
```

Aspects of the invention provide an efficient (in terms of power consumption and speed) implementation of an advanced video decoding method. In order to realize such an efficient implementation a particular methodology can be used for analyzing prior-art methods because the large amount of code of such advanced video decoding methods generally forms a prejudice for persons skilled in the art for allowing changes in these codes. Further arrangement of the data stream in such methods often (for instance in case of data partitioning) further inhibits such a change. Modifications can be made to reduce the level at which programming loops to smaller data portions, resulting in a substantially full block-based loop by breaking data dependencies. The recognition that at block level, a further conditional approach is possible, can lead to efficient implementation.

In a third aspect of the invention decoders and encoders are provided for executing the previously described video coding methods. In one embodiment, a device comprises a processing unit, configured to perform block data structure decoding, and a memory for storage of pixel information of the data structure, wherein the memory is capable of storing at most 2 image data structures. In another embodiment, a device comprises a memory hierarchy with three memories, the memory hierarchy comprising a first memory for storing a complete data image structure, a second memory capable of storing a plurality of blocks but less than one macroblock data structure, and a third memory, capable of storing one block data structure but less than two block data structures.

In one embodiment of the invention, a method of decoding a received bitstream of compressed video data comprises decoding motion vector information and header information for a macroblock of a current video frame from the received bitstream for each of a plurality of macroblocks of the previously decoded video frame, and performing motion compensation on the block of the previously decoded video frame for each of a plurality of blocks of the macroblock of the current video frame:

The decoding method may further be characterized in that the motion vector information for a macroblock contains either a motion vector associated with the macroblock or a plurality of motion vectors, wherein each motion vector is associated with a block, and wherein each block is part of the macroblock. Further, motion compensation on a block may be based on either a motion vector determined from the motion vector associated with the corresponding macroblock or the motion vector associated with the block.

The execution of the motion compensation of the above method can explicitly exploit the additional information for determining whether and how the motion compensation is executed wherein the motion vector information for a macroblock contains either a motion vector associated with the macroblock or a plurality of motion vectors each being associated with a block where the block is part of the macroblock, and additional information about the error information of the macroblock and its blocks.

In addition, execution of the motion compensation for blocks of inter-coded macroblocks can be avoided when the inter-coded macro-block has a substantial zero motion vector and substantial zero error information.

In one embodiment of the above method, the execution of the motion compensation for blocks of inter-coded macroblocks is not performed when the inter-coded macro-block has a substantially zero motion vector, substantially non-zero error information, and the block has substantially zero error information.

The above method can further be characterized wherein the motion compensation for blocks of inter-coded macroblocks is executed by only (meaning without error coding and clipping) shifting pixel values (optionally interpolating) of the corresponding block in the previously decoded video frame when the inter-coded macro-block has a substantially zero motion vector, substantially non-zero error information, and the block has substantially zero error information.

The method of decoding can be characterized in one embodiment wherein the motion vector information for a macroblock contains either a motion vector associated with the macroblock or a plurality of motion vectors each being associated with a block, wherein the block is part of the macroblock, along with additional information about the error information of the macroblock and its blocks, and wherein execution of the motion compensation explicitly exploits the motion vector and additional information in order to determine whether and how motion compensation is executed. For motion compensation on the block of the previously decoded video frame, the method of motion compensation comprises accessing a first memory to retrieve a target block of a previous decoded video frame, storing pixel data corresponding to the target block of the previous decoded video frame for motion compensation (by exploiting address determining via motion information) in a second memory, and performing a prediction (error decoding and clipping) on the stored retrieved target block to produce an intermediate current predicted block.

The motion compensation method further comprises storing the intermediate current predicted block in the third memory, and storing the current predicted block in the first memory, wherein the associated block of the previous decoded block can be overwritten by copying from the third memory while overwriting the associated block of the previous decoded block. The method may further be characterized wherein the copying is only performed for these locations in the third memory being changed, wherein changing verification is done by reading from a fourth memory containing the changing status.

In another embodiment, the above method can be characterized wherein the changing status information is derived from the motion vector information and the additional information. In addition, the second memory can be smaller than the third memory, the fourth memory can be smaller than the second memory, and the third memory can be configured so as to be incapable of storing a complete macroblock.

Another embodiment relates to a computer readable medium that includes a program executing the above method of decoding a video bit stream.

BRIEF DESCRIPTION OF THE DRAWINGS

FIG. 23 is a block diagram illustrating an embodiment of a video coder comprising a video decoder.

Figure 1:
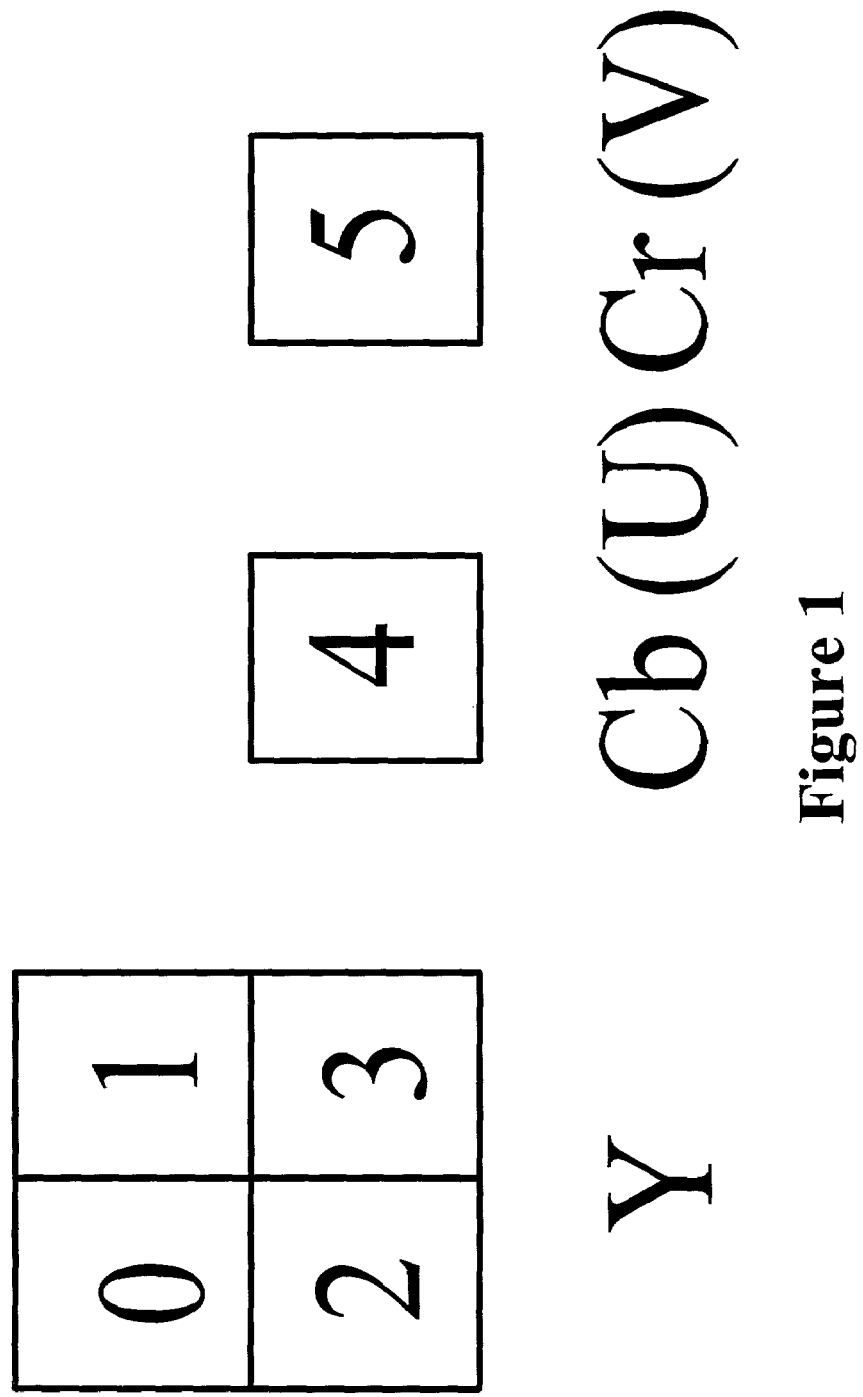
FIG. 1 illustrates an exemplary 4:2:0 Macroblock structure.

Table 1: Characteristics of the video sequences in the functionality testbench.

Table 2: Motion compensation and the IDCT are the memory bottlenecks of the decoder (Foreman CIF 3 test case).

Table 3: At least 6% of the block in intra MBs and 15% of the blocks in inter MBs are not coded.

Table 4: Block IDCT, motion compensation and reconstruction remain memory bottlenecks (Foreman CIF 3 test case).

Table 5: Between 2.3% to 55% of the inter blocks in the functionality testbench are not coded and have zero motion vectors.

Table 6: Between 0.3% and 47.7% of the inter blocks in the demo testbench are not coded and have zero motion vectors.

Table 7: The motion compensation and the reconstruction are the most data intensive parts of the block based decoder (Foreman CIF 3 test case).

Table 8: Characteristics of the video sequences in the demo testbench

Table 9: ATOMIUM pruning reduces the code size by a factor of 2.5. This allows manual code rearrangement that further reduces the code complexity.

Table 10: The block based decoder reduces the global number of accesses by a factor of 5.4 to 18.6.

Table 11: The block based decoder reduces the peak memory usage with a factor 18.1 to 21.7.

Table 12: RISC.

Table 13: PC.

Table 14: Trimedia.

Table 15: One embodiment of memory organization for the block based decoder.

Table 16: Power consumption of the different memories in relative power/frame for CIF. The increase of energy use due to a more complex sequence is bigger in small memories. The M&D column is used as reference for the ratios.

Table 17: The block based decoder reduces the power consumption due to memory by a factor of 32 to 129.

Table 18: The reduction of the number of accesses is an indication of the performance improvement. Framerates are listed for the RISC platform, using integer IDCT in both code versions.

Table 19: The reduction of the number of accesses is an indication of the performance improvement. Framerates are listed for the RISC platform, using integer IDCT in both code versions.

Table 20: After removing the memory bottleneck, the optimization of the computational intensive IDCT shows improvement. Framerates listed for the RISC platform.

Table 21: After removing the memory bottleneck, the optimization of the computational intensive IDCT shows improvement. Framerates listed for the PC platform.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments of the invention are illustrated and described with regard to a decoding method, which is related to similarity exploiting coding methods based on a translation model.

As previously discussed, in prior art video decoding methods the decoding algorithm loops about the macroblocks for each image data structure (further denoted VOP). Within a decoder, assuming a translation model, the first task is reconstruction of the motion information. In case of an inter MB, the motion vector is decoded and the motion compensated MB is stored at the current position in the compensated VOP. In case of an intra MB, the compensated MB is stored as all zeros. Secondly, the texture information is decoded, wherein the texture decoding can exploit, for instance, inverse VLC and inverse scan yield the DCT coefficients. Other transforms besides DCT can be used, such as wavelets. In case of an intra MB, also inverse DC & AC (if enabled) prediction is performed. Inverse quantization and IDCT produce the texture MB that is stored at the current position in the texture VOP.

Embodiments of the invention are further described and illustrated using an MPEG-4 format, however, the methods described are applicable to other image representations having a two-level hierarchy.

As previously discussed in reference to FIG. 1, an MPEG-4 decompressed VOP can be represented as a group of MacroBlocks (MBs). Each MB contains six blocks of 8×8 pixels: 4 luminance (Y), 1 chrominance red (Cr) and 1 chrominance blue (Cb) blocks. FIG. 1 defines the macroblock structure in 4:2:0 format (the chrominance components are downsampled in horizontal and vertical direction).

Instead of processing all MBs of the VOP before composing the reconstructed VOP by adding the compensated and texture VOP, the processing and reconstruction of the current MB is performed before starting the processing of another MB of the VOP. Thus, a method is provided for decoding the bitstream in at least a MB based loop.

In a more particular embodiment of the invention, the processing and reconstruction of a MB is performed according to a block-based approach. For each of the MB's of the VOP, processing and reconstruction of the current block is performed before consideration of another block of the same MB. After decoding a complete VOP, the result is available in the current VOP memory. At the next time instance, the data in current VOP is old and contains the information used for motion compensation. By temporarily storing the results of the current decoded MB in an output buffer (memory 3 in the following pseudo code), the data of the previous VOP used for motion compensation can remain in the frame memory (memory 1 in the following pseudo code) until it is no longer useful to the decoding process. The compensated memory (memory 2 in the following pseudo code) and the texture memory (memory 5 in the following pseudo code) is of block size.

Figure 22B:
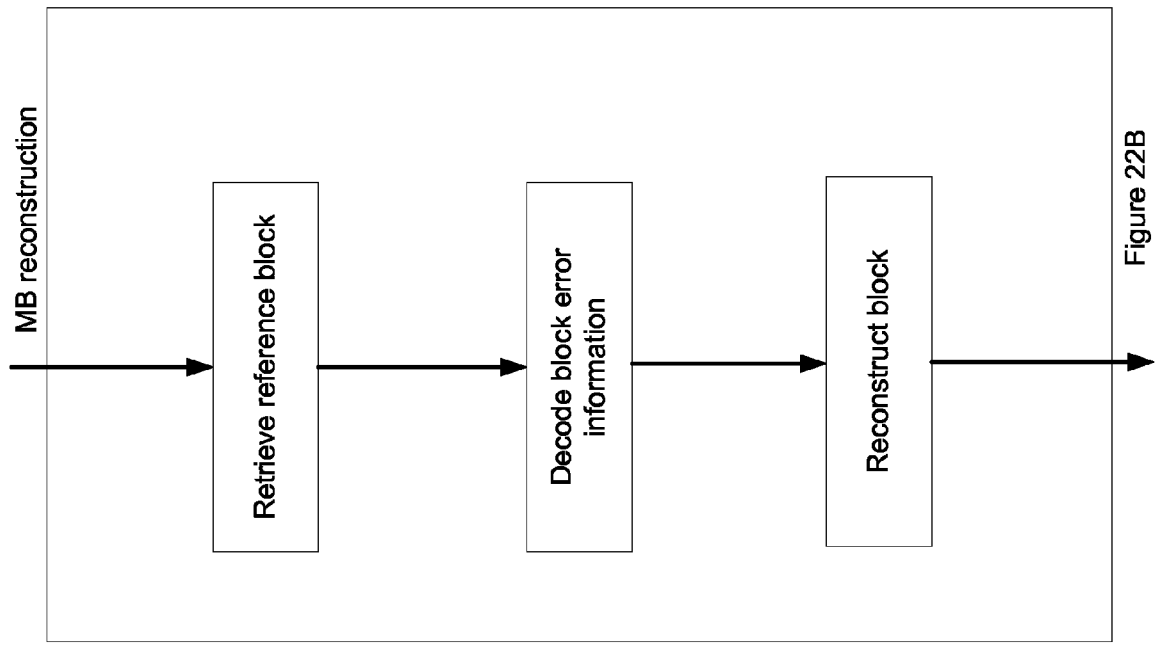
FIG. 22B is a flow diagram of one embodiment of a block-based video decoding method.

The above method of decoding using a block based architecture can be written in pseudo-code as follows, wherein the following code corresponds to the flow diagram of FIG. 22B:

```
For each VOP
    For each inter MB of said VOP
        Read MB related bitstream;
        Decode (Motion Vector information);
        For each block of said inter MB
            Read (reference block from previous VOP
                from a 1st memory);
            Store (said reference block) in a 2e memory
                of block size;
            Decode (texture information of said block);
            Store (decoded texture information) in a 5e
                memory of block size;
            Reconstruct block (by adding info from 2e
                memory and 5e memory);
            Store reconstructed block in a 3e memory of
                multiple MB size but less than VOP size;
            Copy part of 3e memory (by verifying status
                information stored in a 4e memory) in 1e
                memory).
        End_block loop
    End_MB loop
End_VOP loop
```

Definition of the Functionality Testbench and Decoder Pruning

The FDIS (Final Draft International Standard) natural visual can be used as the Verification Model (VM) software in developing an embodiments of the invention.

The VM generally contains all the possible MPEG-4 decoding functionality (i.e. of all possible profiles) resulting in oversized C code distributed over many files. The video decoder itself typically has a code size of 93 files (.h and .c source code files) containing 52928 lines (without counting the comment lines).

Firstly extracting the part of the reference code corresponding to the desired MPEG-4 functionality of the given profile and level can be advantageous. Pruning can be used to automate this error-prone and tedious task, where it removes the unused functions and their calls based on the instrumentation data of a testbench representative of the desired functionality. This implies careful selection of the set of input stimuli, which exercises all of the required functionality. The functionality testbench listed in Table 1, covers the useful video coding tools. Practically, this implies all the tools of the simple profile, except short video header, 4 motion vectors, error resilience tools and variation of the quantization parameter inside the VOP.

Akiyo is a typical head and shoulders sequence with little motion. Foreman is a medium motion sequence, a real life sequence, well suited for evaluations of a mobile application. Calendar and Mobile is a highly complex sequence with multiple, heterogeneous motion. To achieve a specified bitrate, the rate control functionality of the video encoder adapts the quantization level. MPEG-4 allows the encoder to skip a frame when the desired bitrate is hard to reach. These skipped frames explain the difference between the number of displayed VOPs and the number of coded VOPs (when the encoder skips a frame, the decoder displays the previous one). The results listed in Table 1 are for an MPEG-4 simple profile for CIF (358×288) and QCIF (176×144) image sizes.

Applying automatic pruning with this functionality testbench can reduce the code to 40% of its original size (2.5× reduction). From this point, further manual code reorganization and rewriting becomes feasible. Through the complete analysis and optimizations, the Foreman CIF 3 test case will be used as an example for the detailed study of the effects and bottlenecks. The Foreman CIF 3 test case uses no rate control and hence the decoder has to activate the decompression functionality for every frame of the sequence (a skipped frame requires display but no decompression).

Initial Decoder Analysis

An analysis of the data transfer and storage characteristics and the computational load of the coder initially allows an early detection of the possible implementation bottlenecks and subsequently provides a reference to measure the effects of optimizations. Counting the number of cycles assesses the computational load.

Table 2 lists the most memory intensive functions together with the relative execution time spent in each function for the Foreman CIF 3 test case. The timing results were obtained on a HP9000/K460, 180 MHz RISC (Reduced Instruction Set Computing) platform. As expected, memory bottlenecks occurring at this platform independent level also turn out to consume much time on the RISC platform. The time spent on WriteOutputImage is due to network overhead and disk accessing. Although its time contribution is very large, it can advantageously be neglected during the optimizations (in the implemented design, no writing to disk will occur). The last column of the table is produced with WriteOutputImage disabled. The following list explains the behavior of the functions in Table 2:

VopMotionCompensate: Picks the MB positioned by the motion vectors from the previous reconstructed VOP. In case of halfpell motion vectors, interpolation is required.

BlockIDCT: Inverse Discrete Cosine Transform of an 8×8 block.

VopTextureUpdate: Add the motion compensated and texture VOP.

BlockDequantization: Inverse quantization of the DCT coefficients.

CloneVop: Copies data of current to previous reconstructed VOP by duplicating it.

VopPadding: Add a border to previous reconstructed VOP to allow motion vectors to point out of the VOP.

WriteOutputImage: Write the previous reconstructed VOP (without border) to the output files.

Only the IDCT is a computationally intensive function, all the others mainly involve data transfer and storage. The motion compensation and block IDCT together cause more than 40% of the total number of memory accesses, making them the main implementation bottlenecks. Hence, these functions are advantageously the focus of memory optimizations (i.e. reduce the number of accesses).

For both hardware and software, the size of the accessed memory can be significant. Accesses to smaller memories have a better locality and therefore typically result in a higher cache hit chance for software and in lower power consumption for hardware. The chart of FIG. 3 groups the memory accesses to 4 memory sizes: frame memory (minimum size is width×height of the VOP), large buffer (containing more than 64 elements), buffer (with 9 to 63 elements), and registers (with a maximum of 8 elements).

Figure 3:
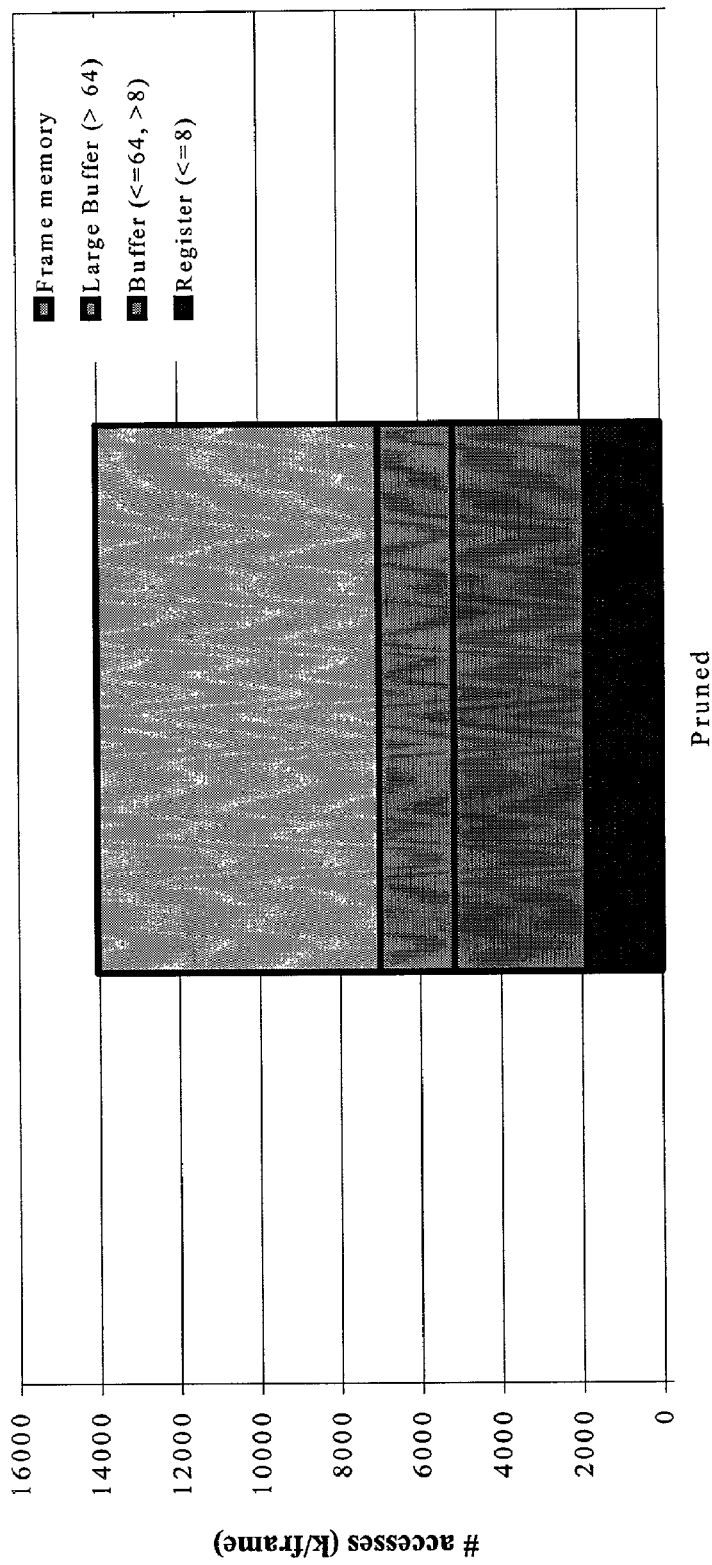
FIG. 3 is a graphical illustration of the number and location of memory accesses by a pruned decoder.

In this initial analysis stage, the wordlength of the elements is not considered. As illustrated in FIG. 3, 50% of the total number of accesses are to frame memory, 13% to a large buffer, 23% to a buffer, and 13% to registers. As accesses to large memories are typically the most inefficient, the optimizations can advantageously focus on reducing the accesses to those memories.

Figure 2:
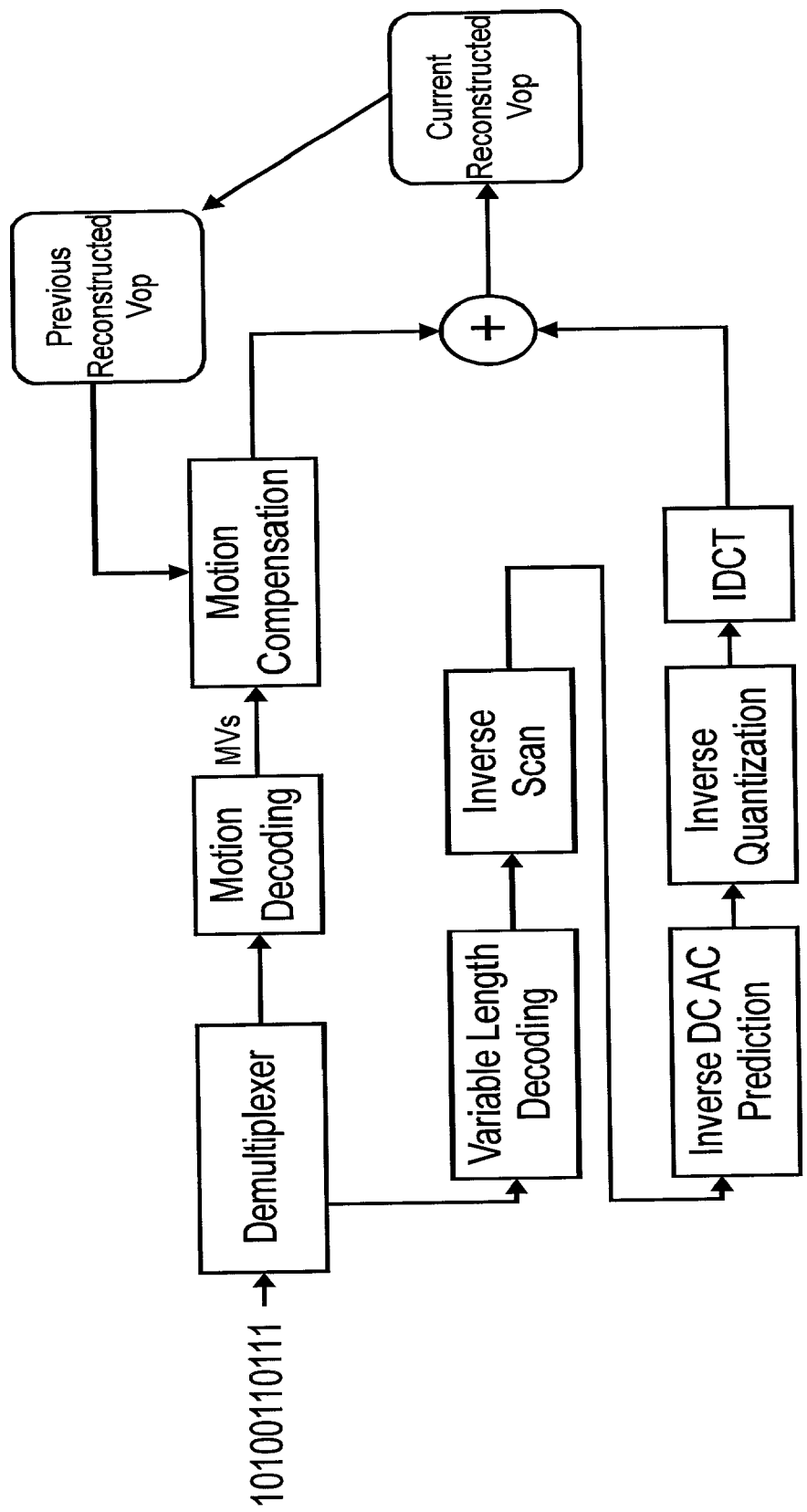
FIG. 2 is a block diagram of a MPEG-4 simple profile video decoder.

Referring back to the prior art video decoder of FIG. 2, in operation, the decoder receives a bitstream and divides it into motion vector information and coded texture information. The motion vector information is exploited for retrieving information of a previously reconstructed VOP, assumed to be available at the decoder already. The coded texture information is decoded, wherein the decoded texture information comprises error texture information. When the error texture information is added to the motion compensated previous VOP information, the current VOP is thereby reconstructed.

Figure 4:
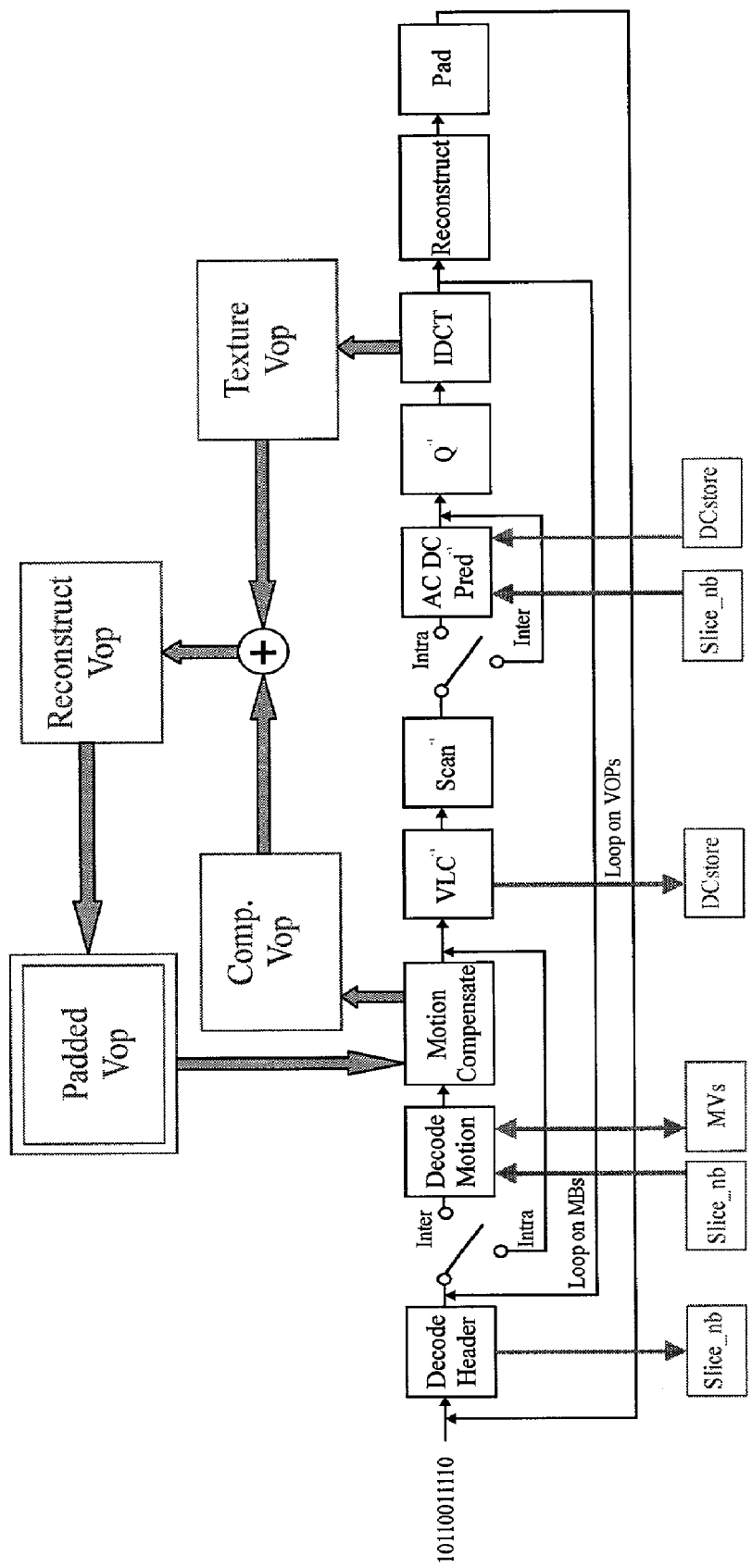
FIG. 4 is one embodiment of a data flow diagram for the FDIS simple profile decoder.

From the initial analysis of the (pruned) FDIS code, a high-level data flow model based on VOP can be derived, as illustrated in the data flow diagram of FIG. 4. The algorithm loops over the MBs for each VOP. First, the motion information is reconstructed. For an inter MB, the motion vector is decoded and the motion compensated MB is stored at the current position in the compensated VOP. For an intra MB, the compensated MB is stored as all zeros.

Second, the texture information is decoded. Inverse VLC and inverse scan yield the DCT coefficients. For an intra MB, inverse DC & AC (if enabled) prediction should also be performed. Inverse quantization and IDCT produce the texture MB that is stored at the current position in the texture VOP.

When all MBs of the VOP are processed, the reconstructed VOP is composed by adding the compensated and texture VOP. This complete VOP is copied as it is needed at the next time instance for the motion compensation as reference. Finally, a border is added to this reference VOP by padding to allow the motion vector to point out of the image. The resulting VOP is called the padded VOP. This illustrates that the data exchanged between the main parts of the decoder is of frame size. Hence, the data flow of the reference decoder of FIG. 4 is VOP based.

Figure 6:
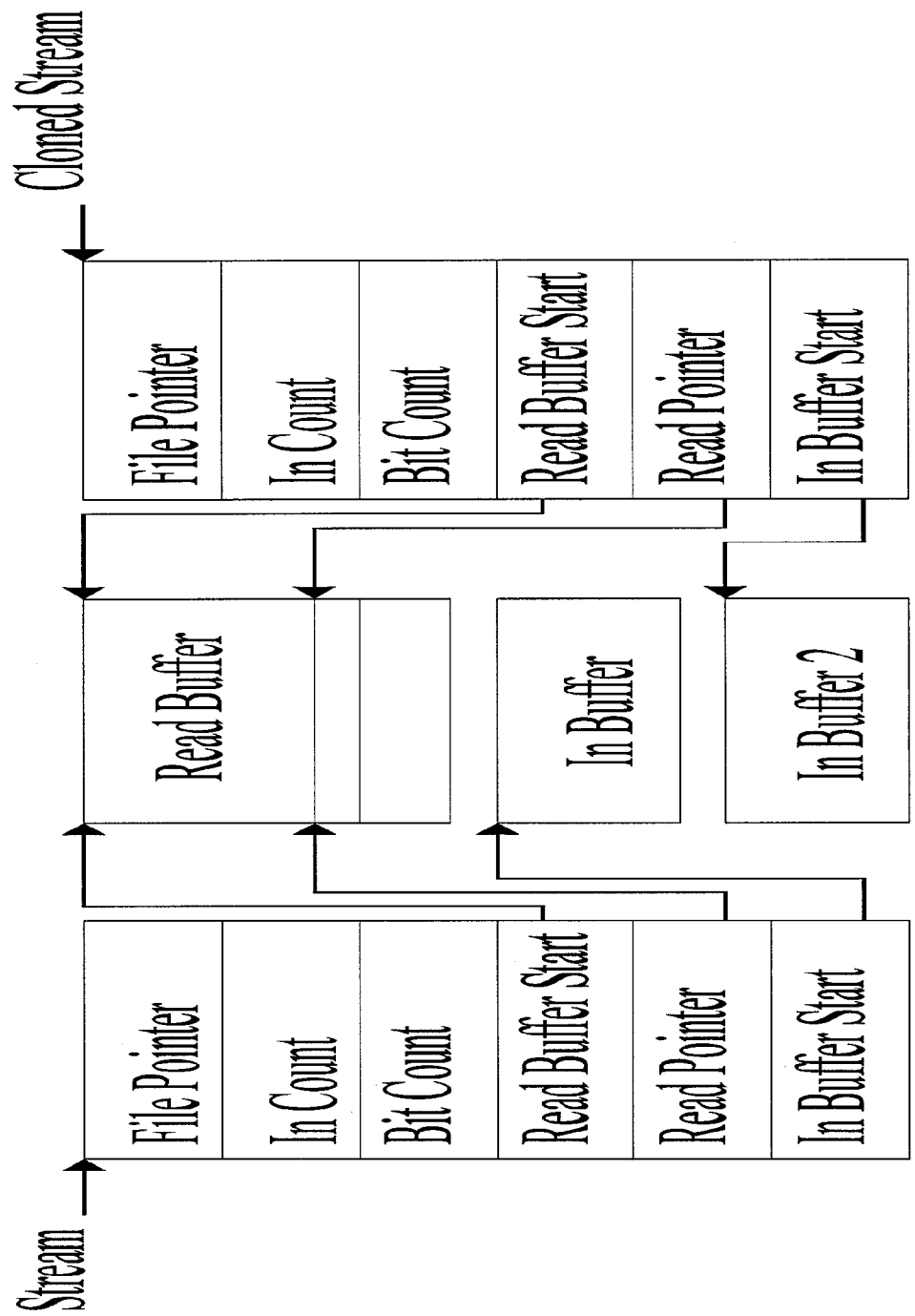
FIG. 6: The cloned bitstream has its separate stream parameters and in buffer while the read buffer is shared.
Figure 22A:
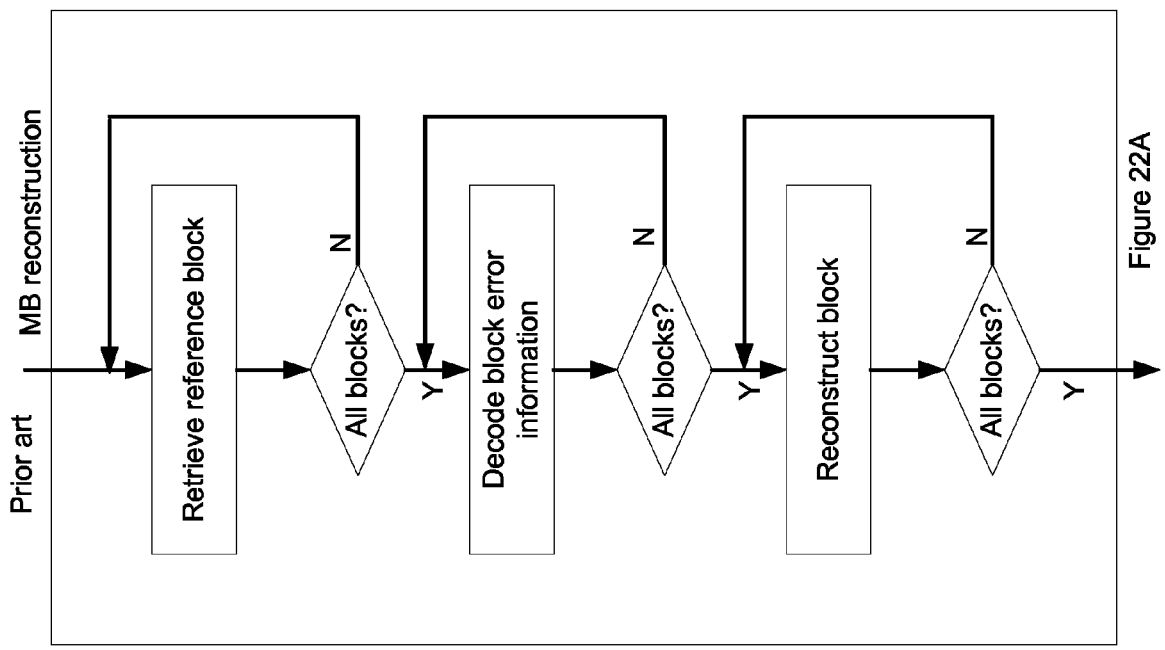
FIG. 22A is a flow diagram of a prior-art MB based video decoding method.

FIG. 6 indicates that from the received bitstream the motion vector header is decoded. Then depending on type of MB (intra, inter) some operations happen. In case of an inter coded MB, the motion vector information is decoded (see decode motion block) in a MB loop (see top left loop in FIG. 22) and used for retrieving data from a memory containing the previous decoded VOP (in the padded VOP) memory. Then the error texture decoding for all MB is started (involving various steps of VLC, Scan, AC DC prediction, quantization and IDCT) and added to the texture VOP (see middle left loop in FIG. 22). Thereafter the reconstruct step is performed.

Decoder Optimization Steps

The memory optimizations of the MPEG-4 video decoder are carried out in two main parts. First the data flow is reorganized to MB basis, secondly to block basis.

MacroBlock Based Data Flow Structure

The previous analysis clearly indicates that the decoding process makes many accesses to large memories. This subsection describes how padding with a temporary buffer and reconstruction at macroblock level makes the data flow macroblock based.

Breaking Flow Dependencies

Figure 5:
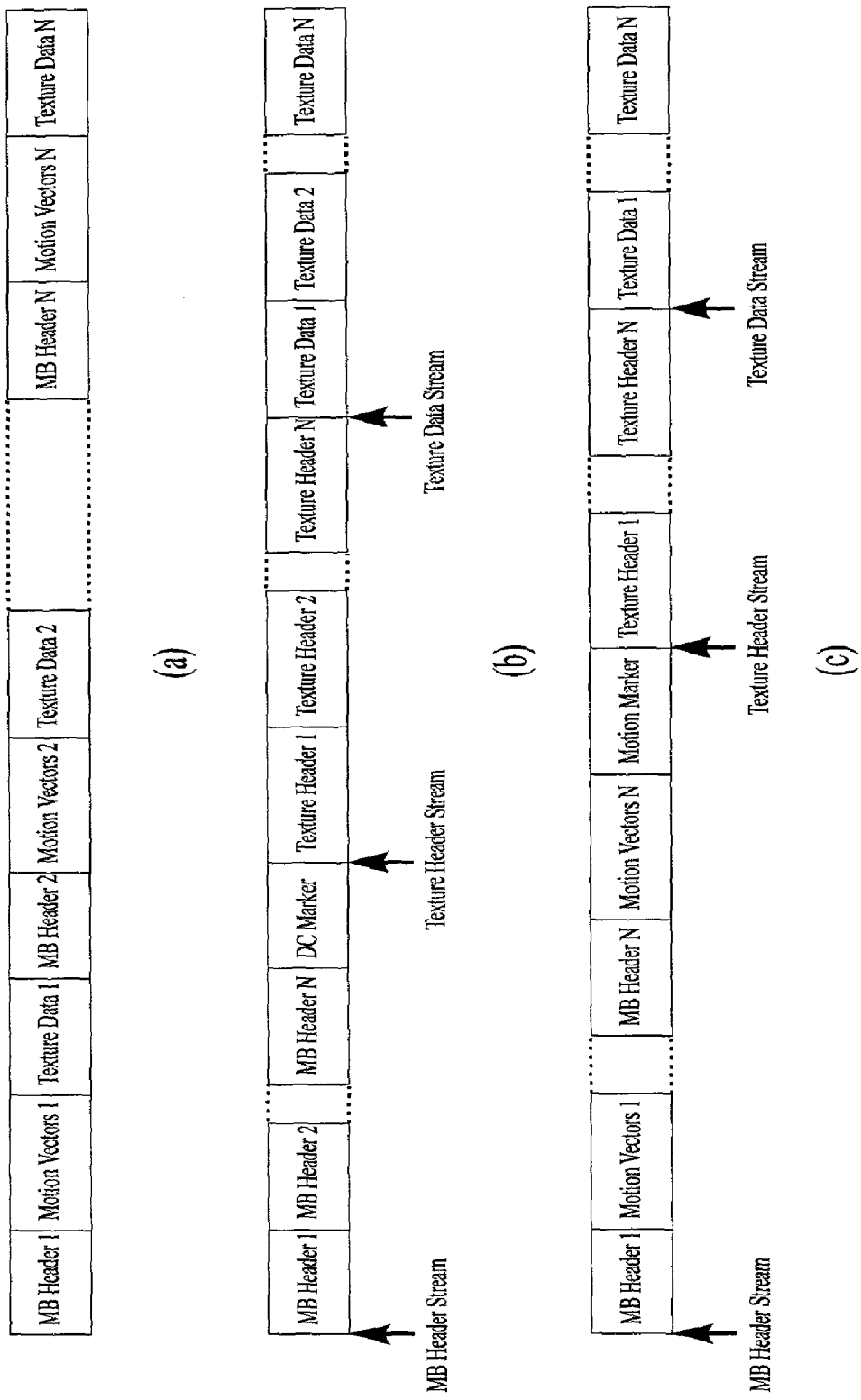
FIG. 5(a) is an exemplary illustration of a bitstream structure which is not data partitioned.
FIG. 5(b) is an exemplary illustration of a bitstream with data partitioned I VOPs.
FIG. 5(c) is an exemplary illustration of a bitstream with data partitioned P VOPs.

As illustrated in FIG. 5(a), a normal (no data partitioning) MPEG-4 video bitstream is structured in a MB way; first a header, then the motion vectors, and finally the texture data of the current MB. With resynchronization enabled, several MBs are grouped in a video packet, surrounded by resync markers. The order of the information of a MB in such a video packet is not changed. When additionally, data partitioning is activated, the most important information of the macroblocks in the video packet is put in front to improve the error resilience/concealment. An extra marker (DC marker in case of an I VOP and a Motion marker for a P VOP) separates the two parts, as illustrated in FIG. 5(b) and FIG. 5(c), where FIG. 5(b) illustrates data partitioned I VOPs, and FIG. 5(c) illustrates data partitioned P VOPs. This reorganization generally inhibits a true MB based flow, as the reconstruction at MB level can only be performed when the data of the second partition is reached. To avoid buffering of all the (decoded) information of the first partition, as implemented in the reference decoder, the bitstream is read at three places simultaneously.

At the start of a video packet, the current stream is cloned twice. Only the stream parameters are doubled and a separate in buffer is allocated (the read buffer is shared) as illustrated in FIG. 6. To avoid inconsistency, the number of unread bits in the read buffer has to be larger then the maximum number of bits in a video packet. This yields three streams: the first stream points to the macroblock header information, the second stream is positioned right after the DC or motion marker and the last stream is advanced until the start of the texture data. After decoding the complete video packet, the first two streams are freed and the texture data stream is used for continuing the decoding process.

This implementation allows obtaining all necessary information to decode the bitstream in a MB based loop.

MB Based Loop

Figure 7:
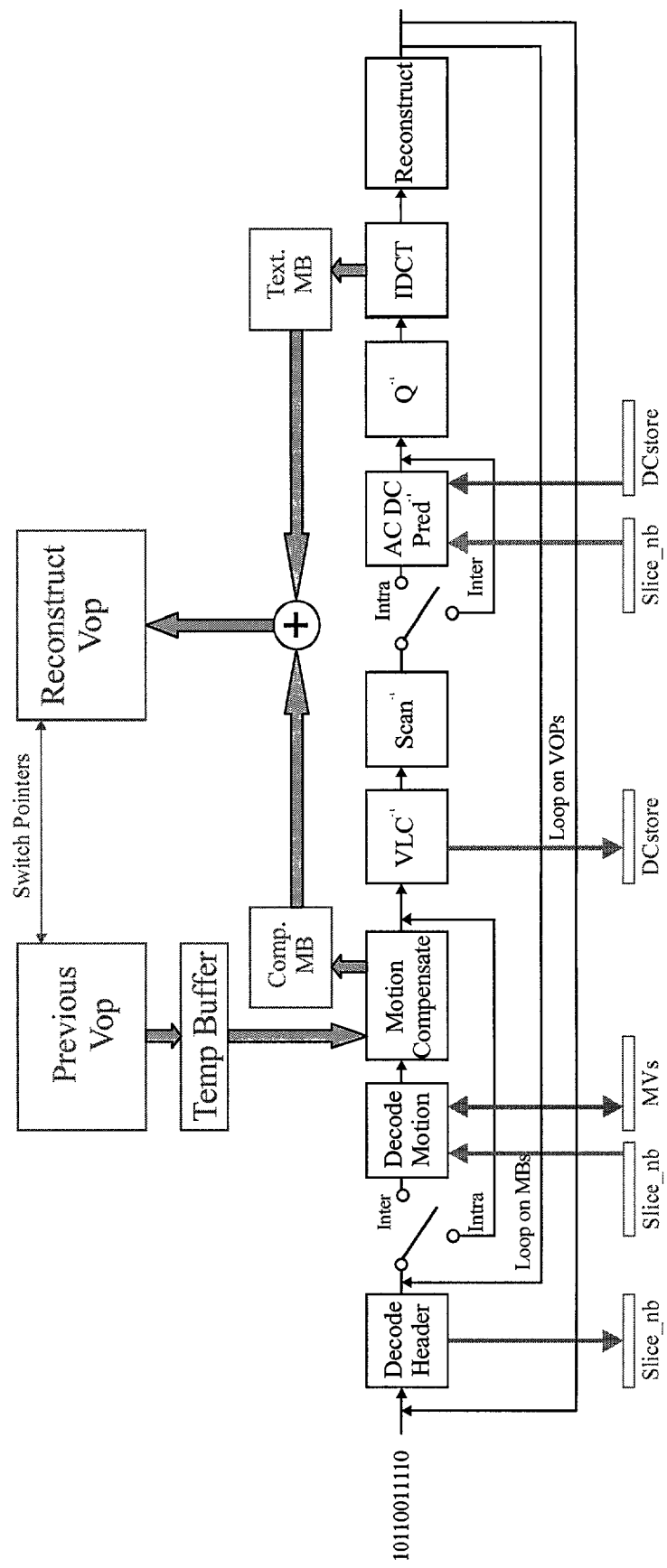
FIG. 7 is one embodiment of a data flow diagram for a MB based video decoder.

FIG. 7 is a data flow diagram of one embodiment of a macroblock based video decoder, as opposed to the reference VOP based decoder of FIG. 4. Shifting the reconstruction part inside the MB loop can reduce the compensated VOP and the texture VOP to MB size and improve the locality of data produced and consumed by the three most data intensive functions: motion compensation, block IDCT and texture updating (Table 2). The reconstructed macroblock is stored in the reconstructed VOP memory (FIG. 7).

Preserving the data in the current reconstructed VOP as the previous VOP for the motion compensation at the next time instance is achieved by switching the pointers to those memories. This overrules the copying of data, the method implemented in the reference decoder. The techniques to avoid the padding will be discussed further hereinafter. At the MB based level, this bottleneck is addressed temporarily by introducing a buffer.

These modifications can advantageously make the decoder entirely macroblock based, as illustrated in FIG. 7. According to FIG. 7, the motion vector header is decoded from the received bitstream. Depending on the type of MB (intra, inter), predefined operations are performed. For an inter coded MB, the motion vector information is decoded at a decode motion block and used for retrieving MB data from a memory containing the previously decoded VOP. Following motion vector decoding, the error texture decoding for the same MB is started (involving various steps of VLC, Scan, AC DC prediction, quantization and IDCT) and added to the texture MB. Thereafter, the reconstruct step is performed at MB level.

Buffer Size Restriction

Figure 8:
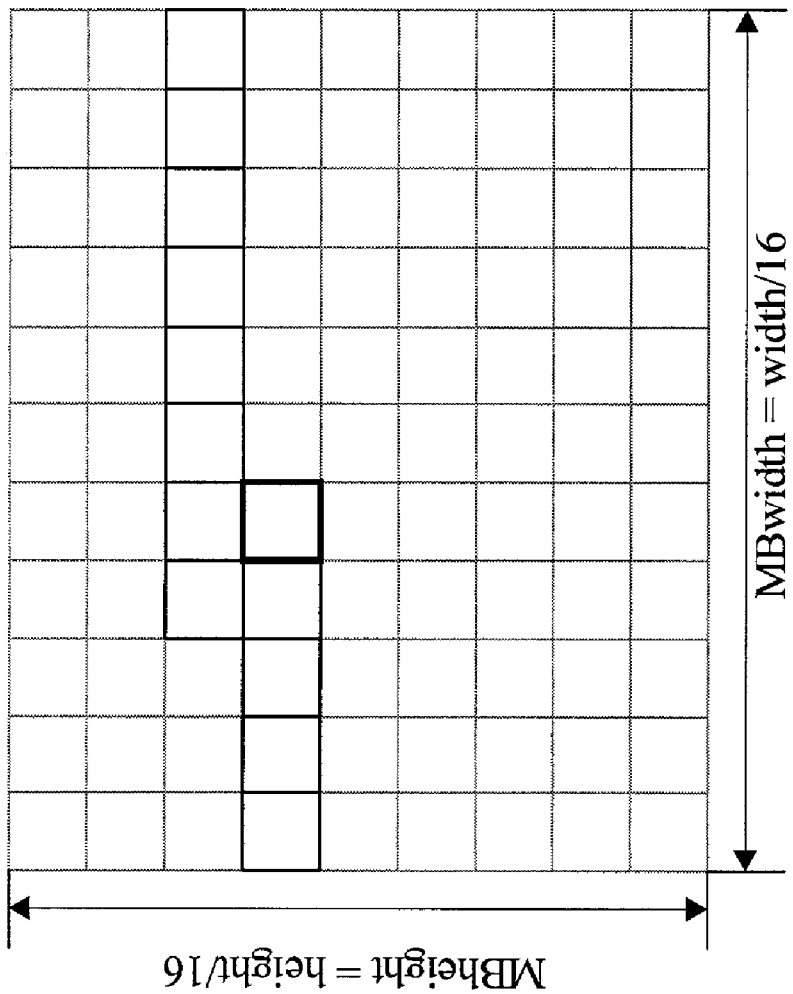
FIG. 8 is an exemplary illustration of a plurality of circular line buffers containing macroblock information.

The reference decoder uses one buffer (slice_nb) to keep track of the video packets (predictive coding of motion vectors and DCT coefficients can only be performed within the same video packet), and two buffers for storing the DC and AC DCT coefficients and the motion vectors. The number of elements of these buffers is related to the total number of macroblocks. During the inverse prediction of the DCT coefficients or the motion vectors, in a worst-case scenario the data of the macroblock on the previous row (up) and previous column (left) is desired, as illustrated in FIG. 8. The results of the inverse prediction, such results possible desired for a future MB, can be stored at that position without loss of information. Hence, to reduce the required memory, these three buffers are width restricted to circular line buffers with size $$LB = \frac{width}{16} + 2 = MBwidth + 2.$$

Reduction of the Invocation of IDCT and Inverse Quantization

Each of the six blocks in a macroblock carries a Coded Block Pattern (CBP), indicating whether the texture block contains information. A CBP equal to zero for a block in an intra MB means that only the DC DCT coefficient is non-zero. A zero CBP for a block in an inter MB indicates that all DCT coefficients are zero. Taking the information contained in the coded block pattern into account, a simplified dequantization and IDCT for blocks in intra MBs is implemented. For blocks in inter MBs, no operations have to be computed, as the result is a block filled with zeros.

Table 3 lists the percentage of un-coded blocks for both the intra and inter case. For the most complex sequence in the functionality testbench (Calendar and Mobile) where the lowest number of non-zero CBPs can be expected, 6% of the intra blocks can be decoded with the simplified functionality and 15% of the inter blocks need no computations. For real-life sequences, this amount is higher (50%), making this high level modification an efficient way of approaching the computational and memory bottleneck of the IDCT and dequantization. The traditional ways of optimizing the IDCT are still applicable following this platform independent stage and can result in further improvement.

Optimization Results

Figure 9:
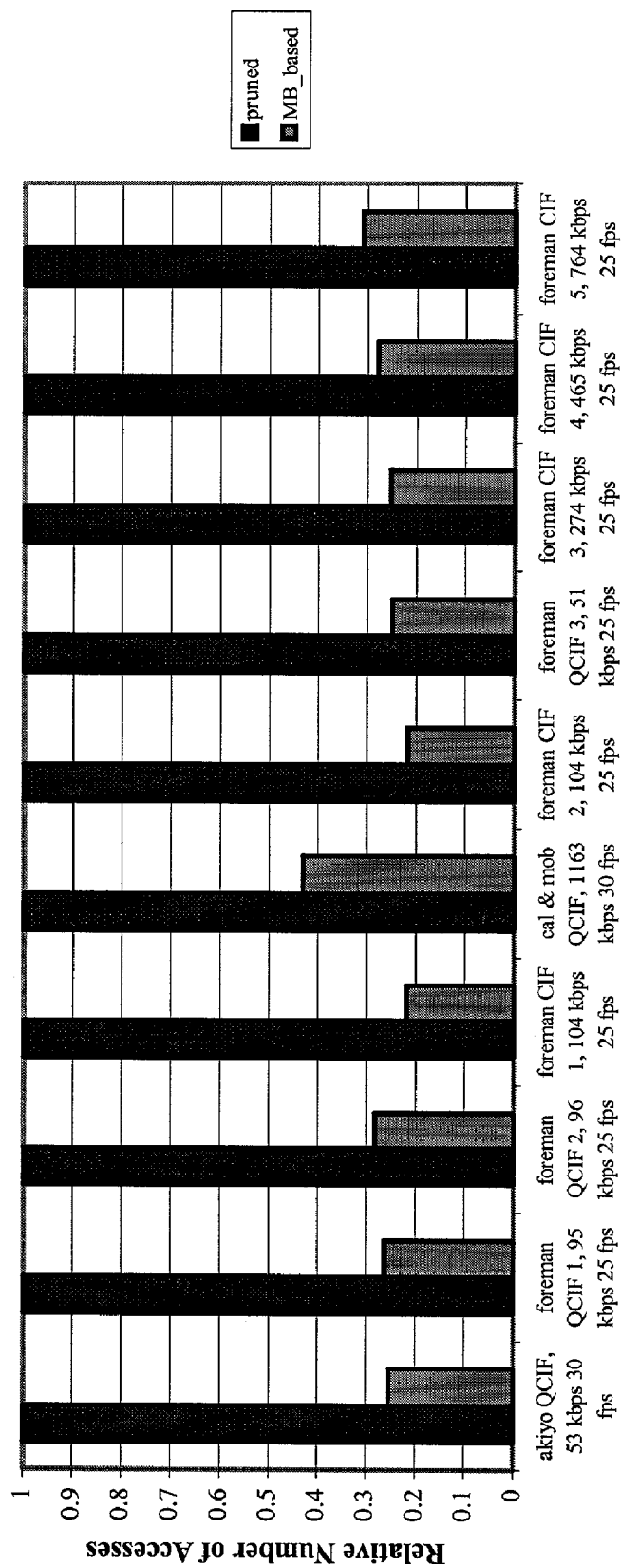
FIG. 9 is a graphical illustration of the reduction in global number of memory accesses due to macroblock based decoding.

As illustrated by the graph of FIG. 9, the macroblock based MPEG-4 video decoder reduces the global number of memory accesses by a factor of 2.4 to 4.5 as compared to the reference decoder. The use of the coded block pattern makes the optimization results sequence dependent. The Foreman CIF 1 and 2 test cases contain the highest number of un-coded blocks (CBP equal to zero) and consequently, they have the best improvement. In contrast, the Calendar and Mobile QCIF test case codes almost all the blocks and therefore has the smallest reduction in number of accesses.

Figure 10:
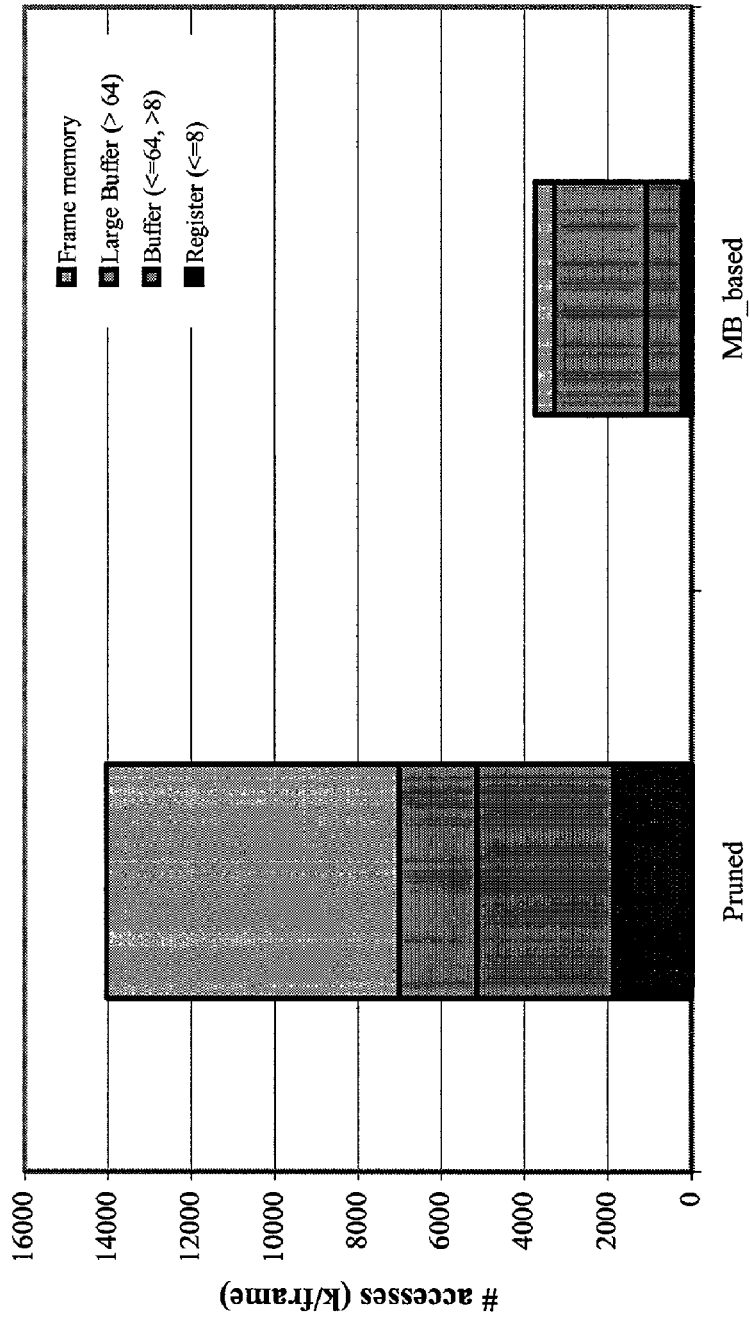
FIG. 10 is a graphical illustration of the number and location of memory accesses by a pruned decoder and a macroblock based decoder.

Analyzing the access behavior of Foreman CIF 3 as illustrated in the graph of FIG. 10 shows the improvement of the data locality at MB level. Because the accesses to frame memory (12%) are minimized as compared to the VM, most accesses are now to large buffers (59%), typically of macroblock size. The decrease of accesses to buffers (23%) and registers (6%) is due to the use of the coded block pattern.

Table 4 compares the most memory intensive functions to the relative execution time spent in each function for the Foreman CIF 3 test case, as performed in the VM decoder analysis (Table 2). The timing results were obtained with quantify on a HP9000/K460, 180 MHz RISC platform. The following list explains the behavior of the functions in Table 4:

MBTextureUpdate: Add the motion compensated and texture MB.
BlockIDCT: Inverse Discrete Cosine Transform of an 8×8 block.
MotionCompensate: Get the MB positioned by the motion vectors from the previous reconstructed VOP. In case of halfpell motion vectors, interpolation is required.
FillVop: Store the decoded MB in the reconstructed VOP.
PutBlock: Put the block in the current MB.
Bzero: Initialize a block with zeros.
MBzero: Initialize a macroblock with zeros.
BlockDequantization: Inverse quantization of the DCT coefficients.
WriteVopRaw: Write the previous reconstructed VOP (without border) to the output files.
Avoid Padding: Temporary functionality to avoid padding.

Compared to the FDIS decoder, the number of cycles used to decode the Foreman CIF 3 sequence dropped by a factor of 3.8 (based on cycle count without writing to disk). Although the total number of accesses of this test case decreased by a factor of four, the motion compensation, block IDCT, and reconstruction remain memory bottlenecks. The temporary techniques introduced to avoid padding cause a large amount of overhead (24.4%, see Table 4), therefore this functionality is the focus of the following optimization phase.

Block Based Data Flow

Removal of the Border

Figure 11:
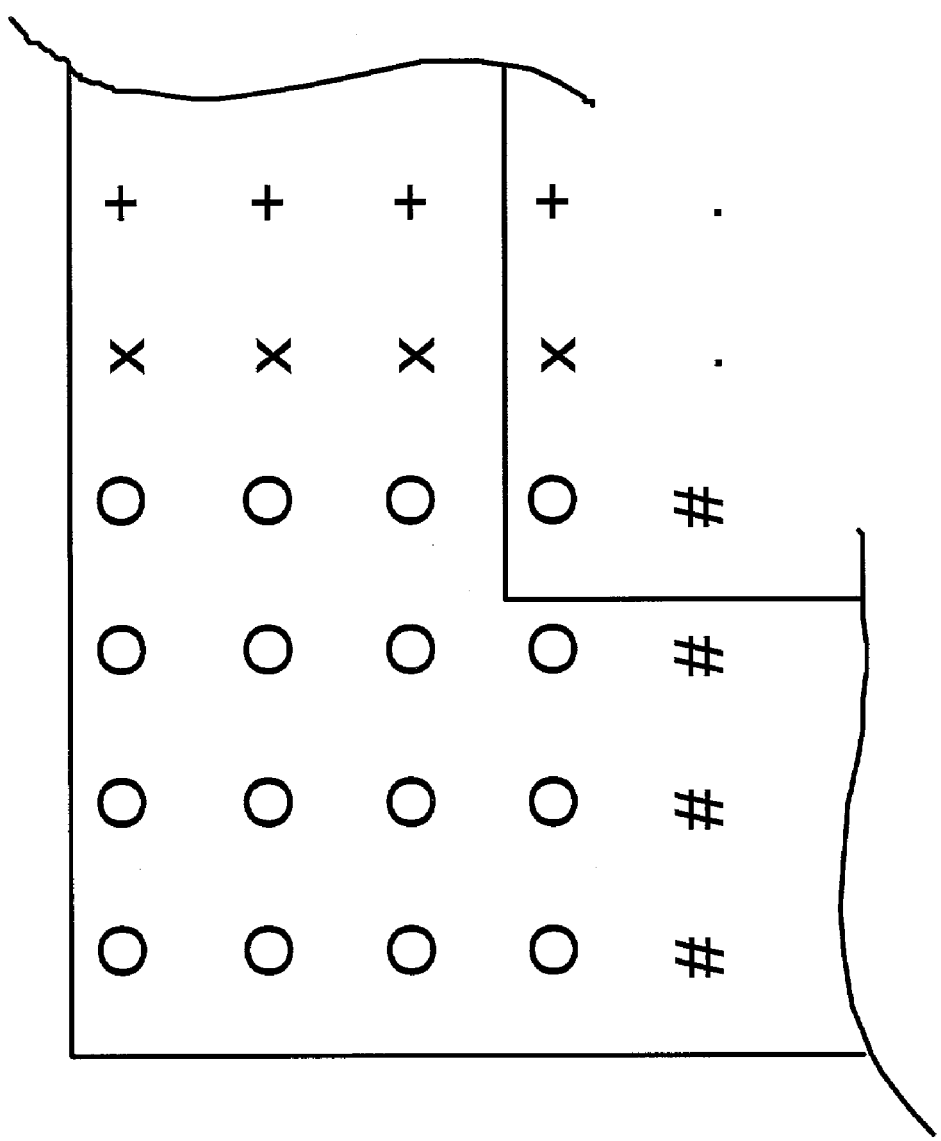
FIG. 11 is an exemplary illustration of a padding process.

The motion vectors of a macroblock can identify the boundaries of a VOP. To compensate for this, the reference decoder adds a border of 16 pixels (the maximum motion vector size) to the previous VOP. This padding process, illustrated in FIG. 11, often results in a large amount of useless copying, however wrapping can avoid the need for adding a border.

Figure 12:
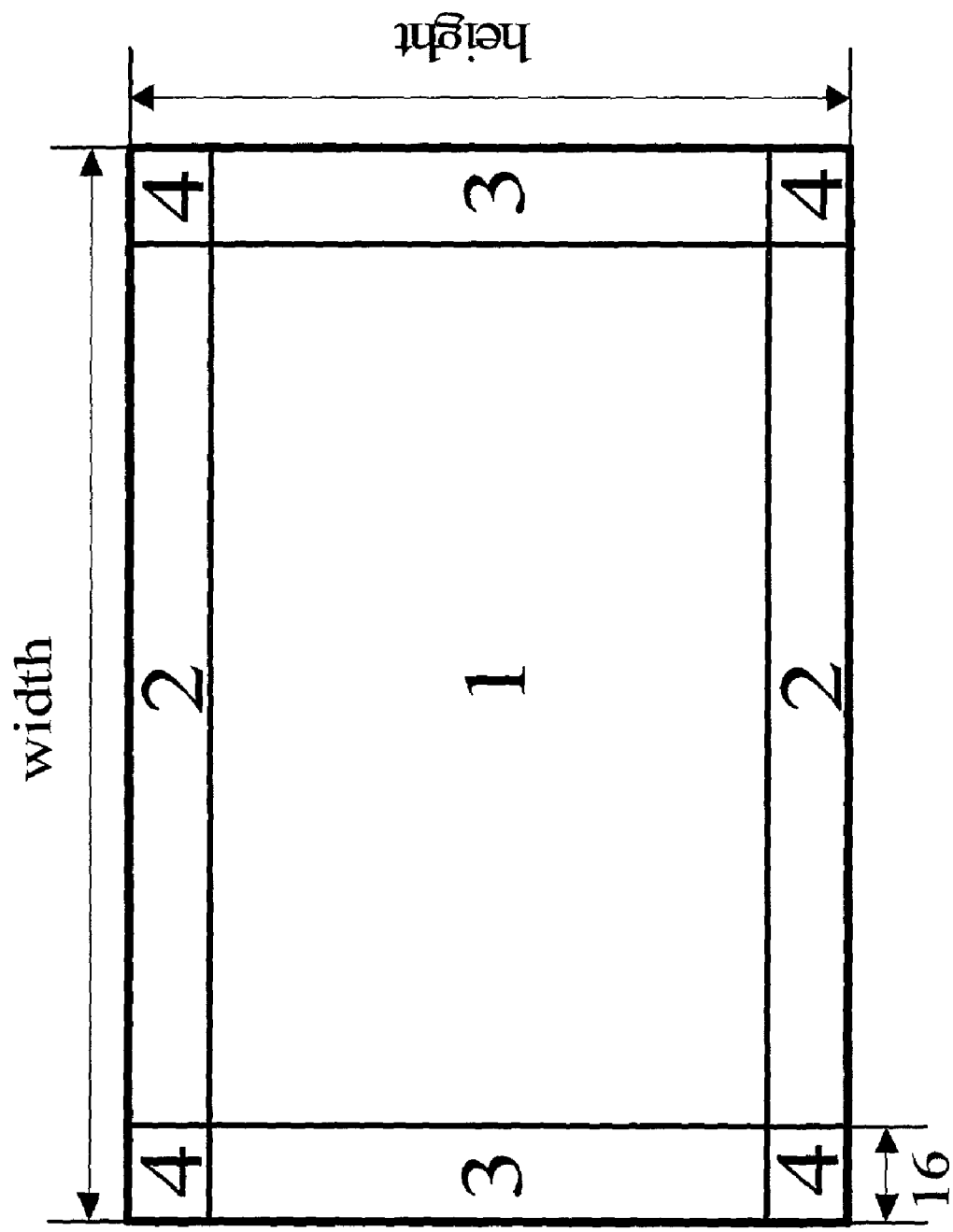
FIG. 12 is an exemplary illustration of four wrapping cases.

Each pixel position calculated from the motion vectors is checked to lie in the VOP boundary. When this is not the case, the coordinate is transformed to the correct position from where the padded pixel would have been. Applying the wrapping function on each of the processed macroblocks of a VOP can cause a large amount of overhead as the checking is performed on every pixel, and can thereby reduce the speed of the decoder. The position of the currently decoded macroblock discriminates four wrapping cases as illustrated in FIG. 12:

1. Inside the MB border: no wrapping necessary.
2. Top or bottom MB border: only wrapping on vertical coordinate necessary.
3. Left or right MB border: only wrapping on horizontal coordinate necessary.
4. Corners: wrapping in both directions necessary.

The resultant order matches the number of occurrences and minimizes the amount of checking required to know the wrapping case. A dedicated motion compensation routine is implemented for each case. These techniques can advantageously make the wrapping overhead negligible.

Block Based Loop

The analysis of the macroblock based flow points to the motion compensation, the block IDCT, and the reconstruction can be identified as the most data intensive procedures of decoding. Performing these steps in a block based loop can further improve the locality of the data and reduce the compensated and texture memory to block size.

Figure 13:
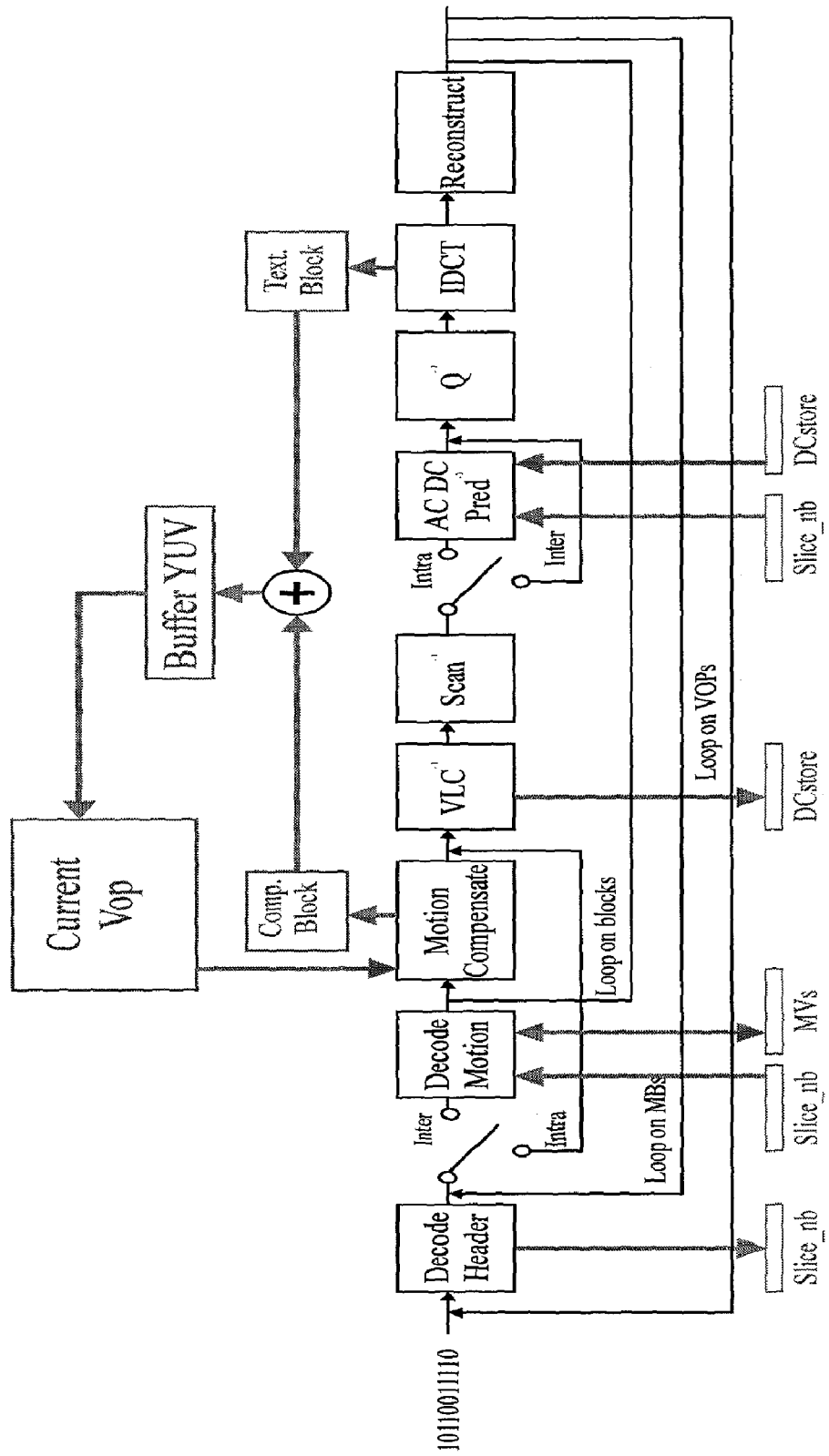
FIG. 13 is one embodiment of a data flow diagram for a block based video decoder.

FIG. 13 is a data flow diagram illustrating a block based loop for decoding a video bitstream. According to FIG. 13, the motion vector header is decoded from the received bitstream. Then, depending on the type of MB (intra, inter), a number of predefined procedures are performed, similar to the data flow diagram of FIG. 7.

For an inter coded MB, the motion vector information is decoded at a decode motion block and used for retrieving block data from a memory containing the previously decoded VOP. Following decoding and block data retrieval, the error texture decoding for the present block is performed (involving various steps of VLC, Scan, AC & DC prediction, quantization and IDCT) and added to the texture block. Thereafter, the reconstruct procedure is performed at block level.

Data Re-Use in Motion Compensation

The occurrence of half pel motion vectors makes the motion compensation a complex procedure in the decoding process as the result is obtained through interpolation. For block based flow, only the required block is interpolated. The output of the interpolation is a one dimensional 64 element motion compensated block. The input is provided from a two dimensional array, containing the information of the reconstructed VOP of the previous time instance. The applicable memory optimizations of this process depend on the interpolation case: horizontal, vertical or two-dimensional. In all three cases, a local circular buffer limits the accesses to the previous VOP memory.

Figure 14:
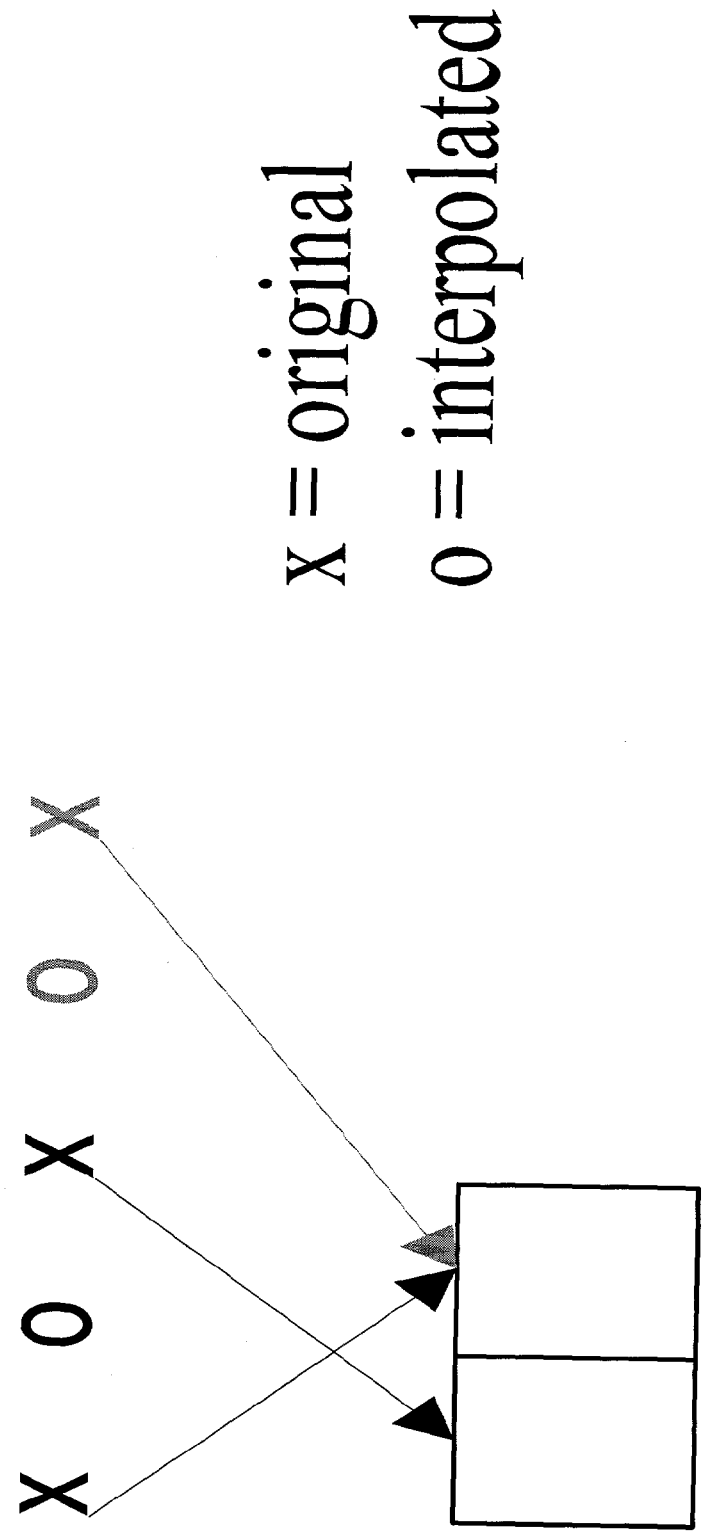
FIG. 14 is an exemplary illustration of a two element buffer for horizontal interpolation.

For horizontal interpolation, a two element buffer is sufficient, as illustrated in FIG. 14. The first pixel, located by the motion vector in the previous VOP memory, is copied to the second position in the buffer, and the second element is copied to the first position. The interpolation is performed on the buffer according to Equation 2, and updating of the buffer is done circularly.

$$i[k] = \frac{b[0] + b[1] + 1 - roundingControl}{2} \quad (2)$$

Figure 15:
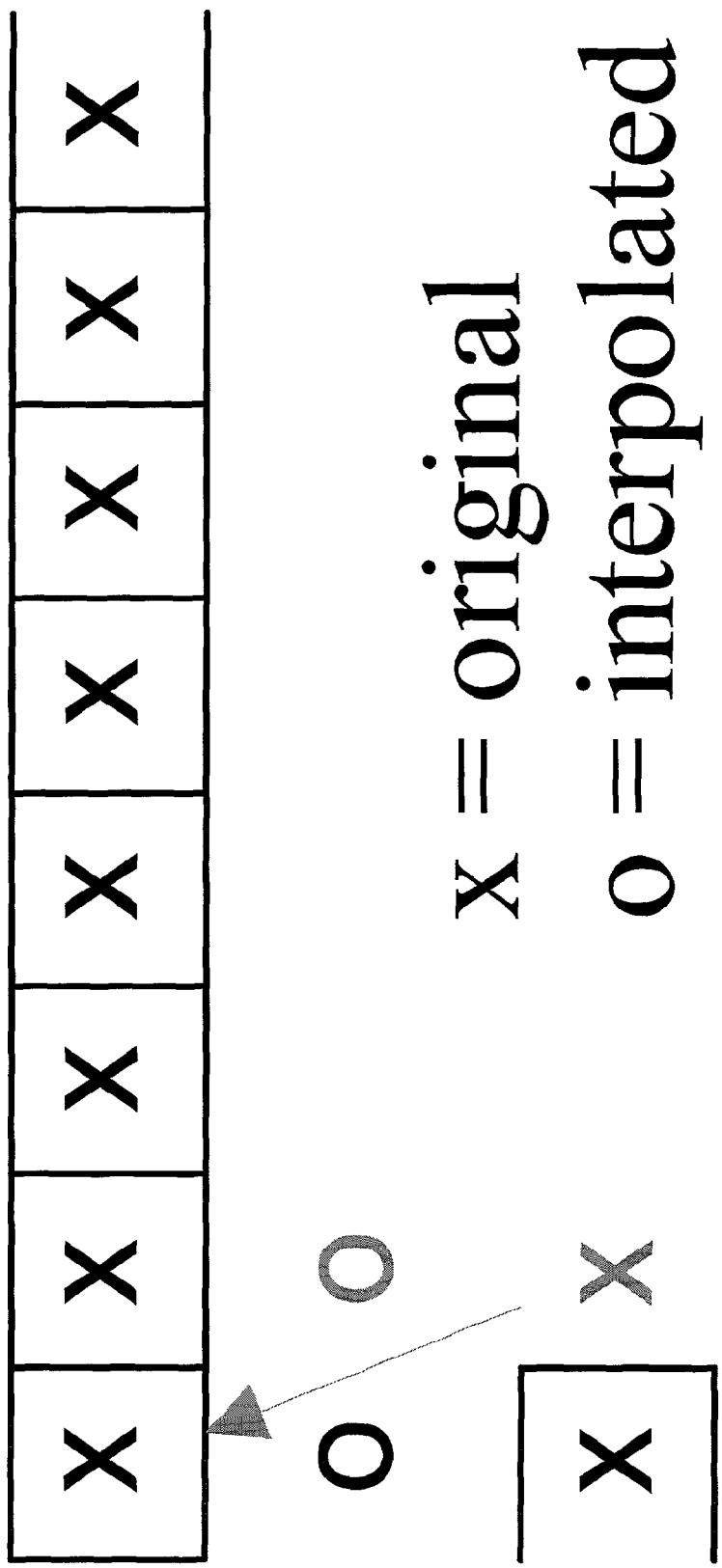
FIG. 15 is an exemplary illustration of a nine element buffer for vertical interpolation.

The vertical interpolation uses a minimal buffer of nine elements, as illustrated in FIG. 15. At initialization, the 8 elements of the first row and the first element of the second row, pointed to by the motion vectors in the previous VOP memory, are copied to the buffer. During the interpolation according to Equation 3, the buffer is updated circularly.

$$i[k] = \frac{b[k\ \%9] + b[(k+8)\%9] + 1 - roundingControl}{2} \quad (3)$$

Figure 16:
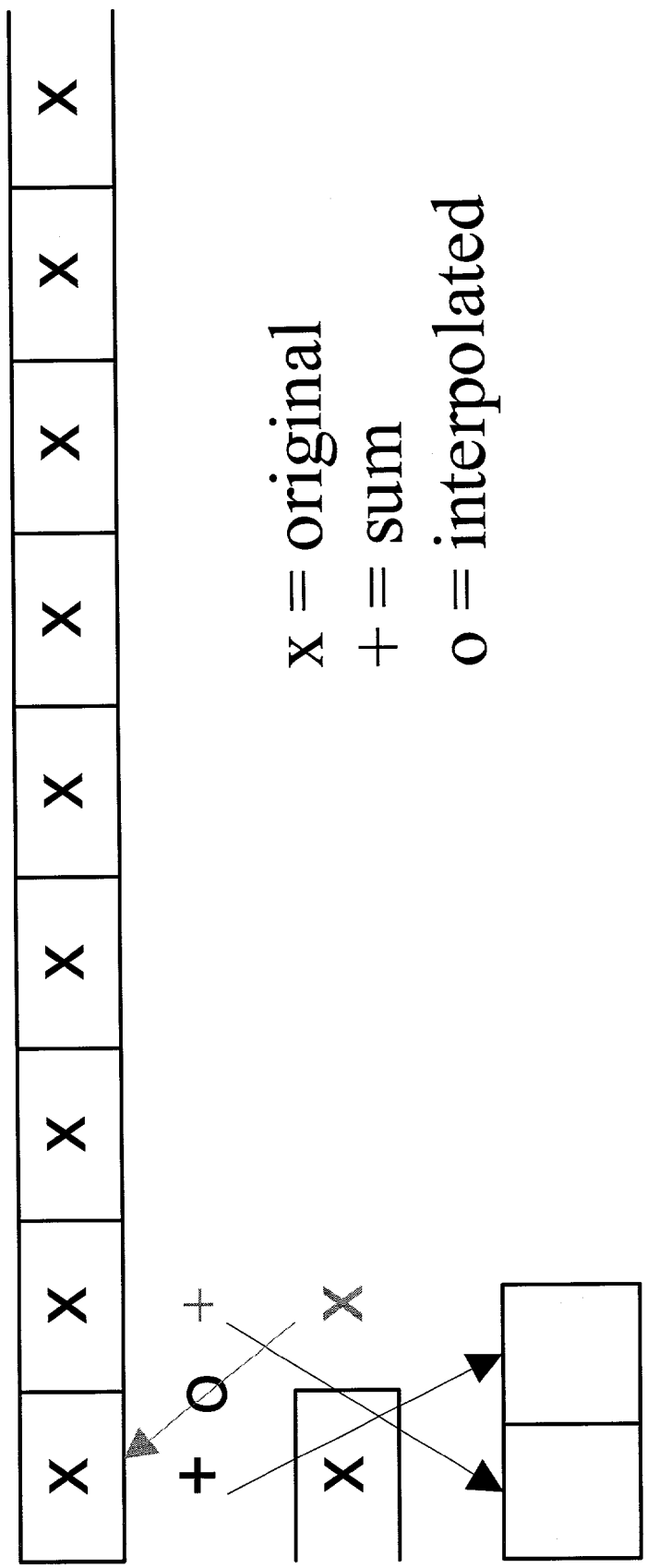
FIG. 16 is an exemplary illustration of a ten element buffer and a two element buffer for 2D interpolation.

For the two-dimensional case, two circular buffers are used, one with two elements, the other containing ten elements, as illustrated in FIG. 16. To avoid redundant additions, the sum, according to Equation 4, of two vertically corresponding pixels is stored in the two element buffer. The values of this buffer are used for the actual interpolation according to Equation 5. During initialization, the 9 elements of the first row and the first element of the second row, pointed to by the motion vectors in the previous VOP memory, are copied to the buffer. Further on, the buffers are updated circularly.

$$s[k\ \%2] = b[k\ \%10] + b[(k+9)\%10] \quad (4)$$

$$i[k] = \frac{b[0] + b[1] + 2 - roundingControl}{4} \quad (5)$$

The previous description indicates a minimal buffer sizes. Many modulo operations are required to determine the accurate position in the nine and ten element buffers (modulo 2 can be replaced by a bitwise AND). Traditionally, the modulo operation is difficult to implement on every platform (large area for hardware and the large number of cycles for software). The analysis feedback confirms the computational overhead on a RISC processor. To reduce the number of modulo operations, the buffer size of the nine and ten element buffers is increased to 16 and the modulo is simplified as a bitwise AND. This trade-off results in a considerable cycle drop for software and an area decrease for hardware.

Restriction of Clipping and Integer Version of IDCT

The MPEG-4 visual standard specifies four places where the current values have to be saturated (clipped):

1. After DC & AC prediction: saturation in the interval [−2048,2047]
2. After dequantization: saturation in the interval [$-2^{bitsPerPixel+3}, 2^{bitsPerPixel+3}-1$]
3. After block IDCT: saturation in the interval [$-2^{bitsPerpixel}, 2^{bitsPerPixel}$]
4. After reconstruction: saturation in the interval [$0, 2^{bitsPerPixel}$]

For an intra macroblock, the last two clipping steps can be merged as the result after block IDCT is the final decoded block. Two versions of the block IDCT are implemented. The first one, specifically for intra macroblocks, immediately clips to the interval [$0, 2^{bitsPerPixel}$]. The second one, to be used in the inter case, produces a block clipped in the interval [$-2^{bitsPerPixel}, 2^{bitsPerPixel}$]. The final clipping in the range [$0, 2^{bitsPerPixel}$] for inter MBs is merged into the reconstruction.

Traditionally, the block IDCT is known to be very computation intensive. The initial decoder analysis and the evaluation of the macroblock based optimizations confirm this. To lower its complexity, the floating point IDCT can advantageously be replaced by an integer version.

Reduce Texture Updates

The coded block pattern can also be used to avoid the addition of the compensated and the error block (next to the reduction of the Invocation of IDCT and Inverse Quantization). In the case of an un-coded block, the motion compensated block can be moved to the frame memory without clipping (no addition occurred, therefore it is confident the elements are still in the correct range).

The difference between the characteristics of intra and inter MBs allows simplification of their dedicated functionality. As an intra macroblock is always coded, checking the coded flag becomes superfluous. An inter macroblock doesn't use inverse DC & AC prediction, however, fixed coefficients are to be stored in the buffers for future prediction. The independence of the coding flag of the MB makes simplification of the code possible.

Merge the Inverse Zigzag, Inverse Quantization, and IDCT for Inter MBs

Merging the inverse zigzag scan, inverse quantization, and IDCT in the inter MB case results in a reduction of accesses to block size arrays. Merging also allows simplification of the dequantization that becomes intra MB specific.

Immediate clipping after AC & DC prediction instead of checking the coefficients before dequantization can lower the number of coefficients that have to be clipped (only the predicted coefficients are clipped).

The combined inverse zigzag, inverse quantization, and IDCT functionality suggests a reduction of the number of multiplication's by performing the dequantization in the first stage of the IDCT. Considering the dequantization as a multiplication, the first stage of the IDCT (Equation 6) can be calculated from the not dequantized coefficients. When the IDCT constants are multiplied with QP as shown in Equation 7, Equation 6 can be rewritten to that shown in Equation 8 to accept the not dequantized coefficients as input. This simplification makes all the multiplication's of the dequantization step superfluous. In addition, the IDCT constants can be updated by additions as the QP is not changing quickly.

$$\begin{cases} x_i = \text{in}[i] \cdot c_{8-i} - \text{in}[8-i] \cdot c_i \\ x_{8-i} = \text{in}[8-i] \cdot c_i + \text{in}[i] \cdot c_{8-i} \end{cases} i = 1, 2, 3 \quad (6)$$

$$\begin{cases} x_0 = (\text{in}[i] + \text{in}[i+4]) \cdot c_4 \\ x_4 = (\text{in}[i] - \text{in}[i+4]) \cdot c_4 \end{cases} i = 0$$

$$qc_i = c_i \cdot QP \quad i = 1 \ldots 7 \quad (7)$$

$$\begin{cases} x_i = \text{in}[i] \cdot qc_{8-i} - \text{in}[8-i] \cdot qc_i \\ x_{8-i} = \text{in}[8-i] \cdot qc_i + \text{in}[i] \cdot qc_{8-i} \end{cases} i = 1, 2, 3 \quad (8)$$

$$\begin{cases} x_0 = (\text{in}[i] + \text{in}[i+4]) \cdot qc_4 \\ x_4 = (\text{in}[i] - \text{in}[i+4]) \cdot qc_4 \end{cases} i = 0$$

Unfortunately, MPEG-4's second dequantization process is not linear, as shown by Equation 9. Substitution of this inverse quantization in the first stage of the IDCT yields complex functionality where the clipping ranges also need to be adapted proportionally to the quantization parameter. This overhead counteracts the benefit of the reduction of multiplications in practical implementations.

$$\text{in}[i] = \quad (9)$$
$$\begin{cases} 0 & \text{if } Qin[i] = 0 \\ \text{sign}(\text{in}[i])((2 \cdot |Qin[i]| + 1) \cdot QP) & \text{if } Qin[i] \neq 0 \text{ and } QP \text{ is odd} \\ \text{sign}(\text{in}[i])((2 \cdot |Qin[i]| + 1) \cdot QP - 1) & \text{if } Qin[i] \neq 0 \text{ and } QP \text{ is even} \end{cases}$$

Note that Equation 9 is only valid for inter MBs and the AC coefficients of intra MBs.

Combine Coded Block Pattern with Value Motion Vectors

When an inter macroblock is coded but has zero motion vectors, some of its texture blocks can consist completely of zeros (coded block pattern is zero). In this special case, nothing has to be done, as the correct block is still in the frame memory. Table 5 and Table 6 list statistics regarding the number of macroblocks and blocks for the functionality and demo testbench respectively. Up to 55% of the inter blocks are not coded and have zero motion vectors. For blocks which are not coded, accesses to the (large) frame memory and the compensated block buffer can be saved.

VOP Memory Reduction

The macroblock based decoder uses two frame size memories; one to store the currently reconstructed VOP, and one containing the previously reconstructed VOP (used for motion compensation). Adding an output buffer of (width+2×16)×16×1.5 pixels to one VOP memory offers sufficient memory space to complete the decoding process.

Figure 17:
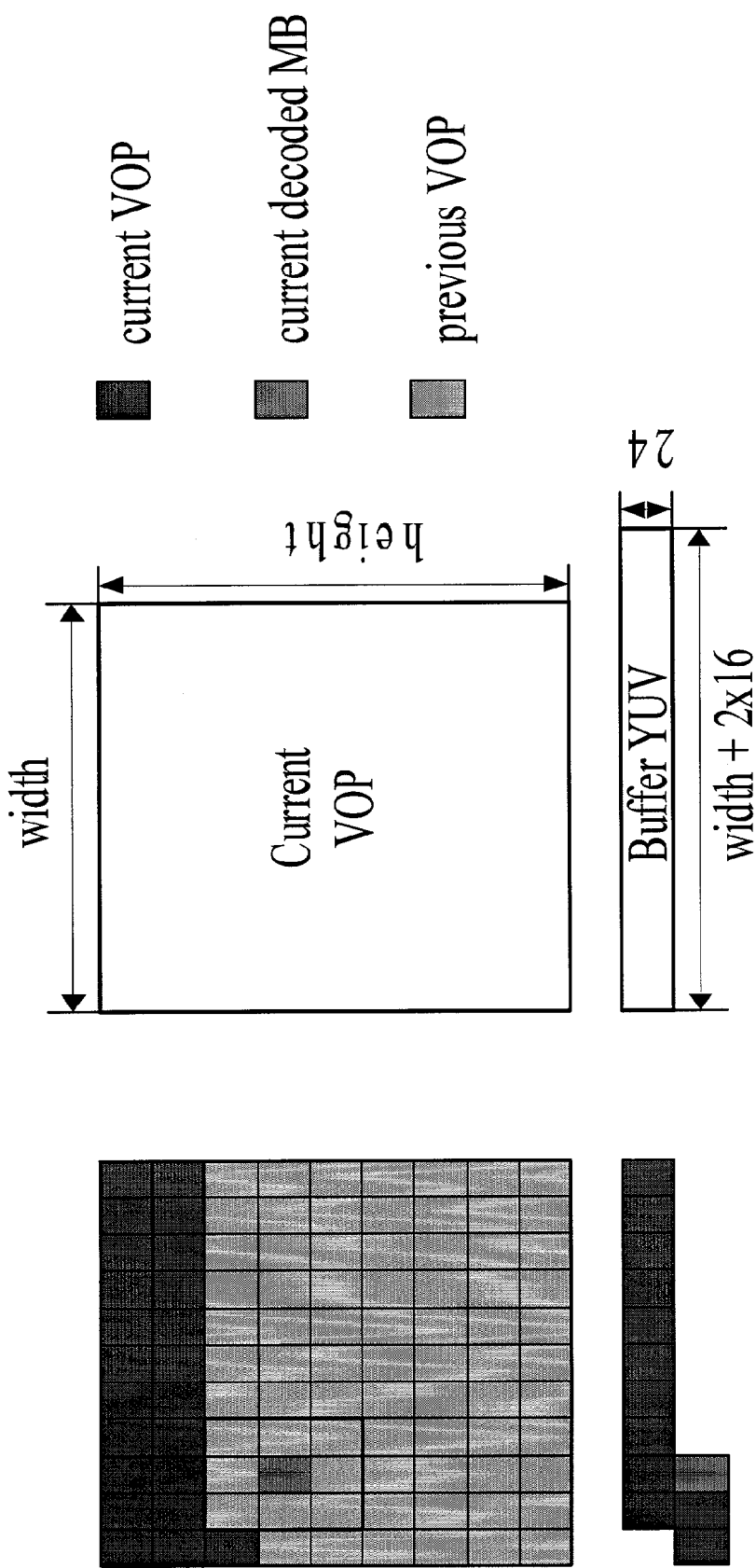
FIG. 17 is an exemplary illustration of a current VOP and an output YUV buffer for the block based decoder.

After decoding a complete VOP, the result is available in the current VOP memory. At the next time instance, the data in the current VOP is old and contains the information for motion compensation. By temporarily storing the results of the current decoded MB in an output buffer (Buffer YUV, FIG. 17), the necessary data of the previous VOP can remain in the frame memory until it is no longer useful to the decoding process. Thus, the lower bound of this output buffer is determined by the motion compensation to $$\frac{\text{width}}{16} + 2 \text{ macroblocks or (width} + 2 \times 16) x 16 \times 1.5 \text{ pixels.}$$

In order to exploit the information of the coded macroblocks flag and the coded block pattern in combination with the motion vectors, an extra block pattern buffer is added. In this memory, a byte is assigned to each MB, storing some of its properties. The first six bits indicate whether the block of the macroblock in the output buffer has changed as compared to the old information in the frame memory. Access to/from the output buffer and to the frame memory can be saved in two cases: the block belongs to a not coded inter macroblock or the block (in a coded inter macroblock) has zero motion vectors and has no error data (coded block pattern zero).

From the above realization we can conclude in comparison with the VOP and MB-based approach that memory space for storage of pixel information of the data structure is foreseen, where the memory is capable of storing at most 2 image data structures. In a further refinement as shown in FIG. 13 a memory hierarchy with three memories, a first memory for storing a complete data image structure, another memory (buffer) capable of storing a plurality of blocks but less than one macroblock data structure; and a third memory, capable of storing one block data structure but less than two block data structures.

DC & AC Prediction Simplification

Figure 18:
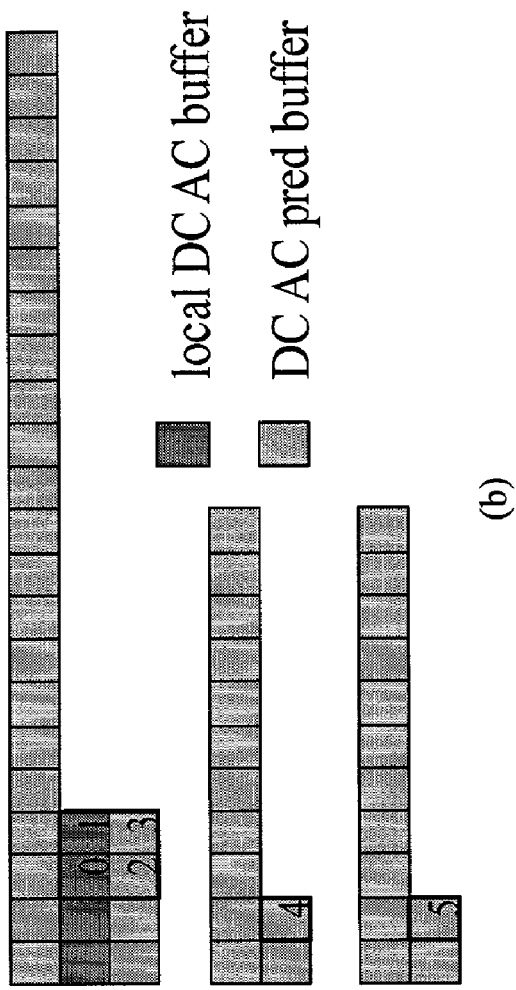
FIG. 18(a) is an exemplary illustration of the neighboring blocks for performing DC & AC prediction of a block X.
FIG. 18(b) is an exemplary illustration of a local buffer used to minimize the DC & AC prediction buffer.
Figure 18:
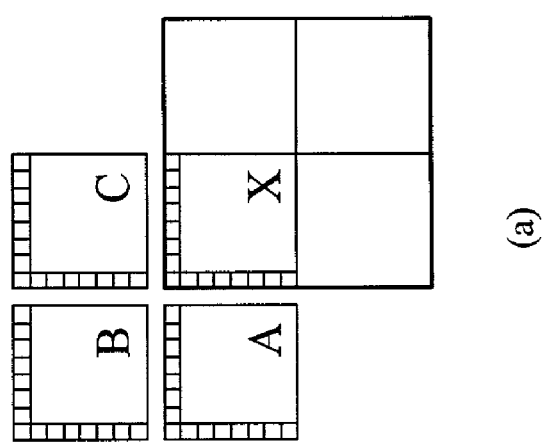

When DC & AC prediction is used on an intra macroblock, it attempts to code the DC coefficient and some AC coefficients (in the first row or the first column) more efficiently by exploiting the values of the neighboring blocks, as illustrated in FIG. 18(a). For each block, these fifteen coefficients are to be stored in memory so as to complete the prediction process. By introducing a local buffer of 4×15 elements, the size of the DC & AC prediction buffer can be minimized to $$\left(\frac{\text{width}}{16} + 2\right) \times 4 \times 15.$$

As illustrated in FIG. 18(b), the entirety of the data used to predict the coefficient of the blocks (marked "0" to "5") of the currently decoded macroblock is available in the local buffer or DC & AC prediction buffer.

When the neighboring blocks belong to an inter macroblock, default settings are used for the values of the DC and AC coefficients. Using the seventh bit in the pattern buffer as inter flag, the storing and reading back of these default coefficients can be excluded. This drastically reduces the accesses from/to the DC AC prediction buffer as most MBs in a video sequence are inter coded.

Optimization Results

Figure 19:
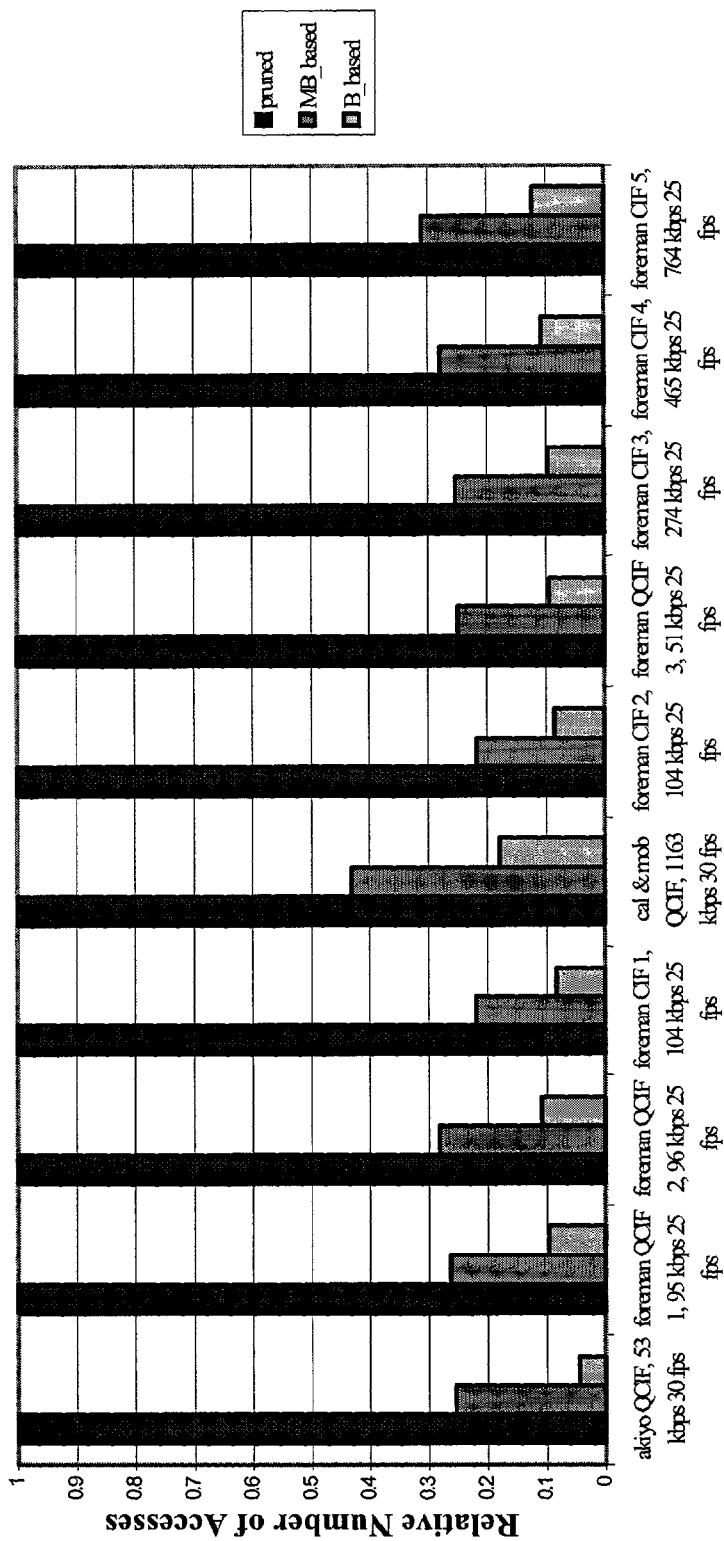
FIG. 19 is a graphical illustration of the reduction in the global number of memory accesses due to block based decoding.

FIG. 19 graphically illustrates the global number of memory accesses by the block based decoder, macroblock based decoder, and reference decoder. The block based MPEG-4 video decoder reduces the global number of memory accesses by a factor of 5.3 to 22.7 as compared to the reference decoder. Again, the effect of the optimizations is sequence dependent as the coding properties at macroblock and block level are further exploited.

Figure 20:
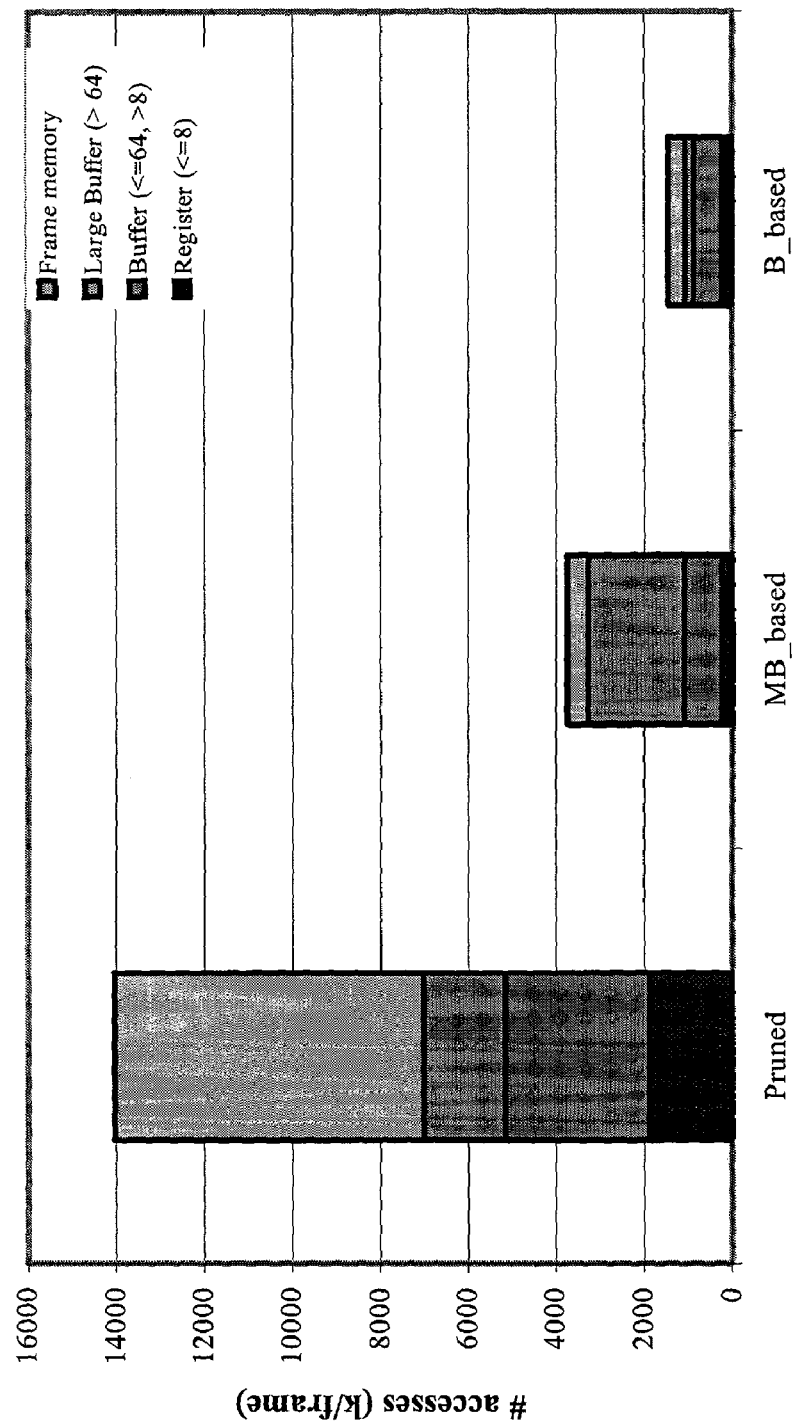
FIG. 20 is a graphical illustration of the number and type of memory accesses for a pruned decoder, a macroblock based decoder, and a block based decoder.

FIG. 20 graphically illustrates the number and location of memory accesses by the block decoder, the macroblock decoder, and the reference decoder. The accesses to large buffers by the block decoder dropped to 13.7%. The buffers, typically of block size, take the largest percentage of accesses at 44.8%. Frame memories and registers are accessed respectively at a rate of 25.4% and 16.1%. FIG. 20 indicates two effects: the reduction of the global number of accesses and the improvement of the locality of the data. These are the main goals of platform independent memory optimizations.

Table 7 compares the most memory intensive functions to the relative execution time spent in each function for the Foreman CIF 3 test case. The timing results were obtained on a HP9000/K460, 180 MHz platform. The following list explains the behavior of the functions in Table 7:

MotionCompensate: Get the block positioned by the motion vectors from the previous reconstructed VOP. In case of halfpell motion vectors, interpolation is required.

BufferToVop: Copy reconstructed macroblocks from the output buffer to the frame memory.

BlockTextureUpdate: Add the motion compensated and texture block and store the result in the output buffer.

InterBlockDequantIDCT: Inverse zigzag scan, dequantization and Inverse Discrete Cosine Transform of an 8×8 block in an inter macroblock.

VLCdecoding: Variable length decoding (MVs, DCT coefficients, header information).

Bzero: Initialize a block with zeros.

IntraBlockIDCT: Inverse Discrete Cosine Transform of an 8×8 block in an intra MB.

IntraBlockDequantization: Inverse quantization of the DCT coefficients in an intra MB.

WriteVopRaw: Write the previous reconstructed VOP (without border) to the output files.

Compared to the FDIS decoder, the number of cycles used to decode the Foreman CIF 3 sequence dropped by a factor of 10.9 (based on cycle count without writing to disk). Still, the motion compensation is data intensive and uses an extended amount of time, but its accesses are localized. The computational load of the IDCT is lowered by the replacement of the floating point by an integer IDCT. Due to the optimization, the relative importance of the VLD increases.

Evaluation of the Optimizations

The effect of the implemented (memory) optimizations can be analyzed both at the platform independent and at the platform dependent level. The number of accesses combined with information about the array and the peak memory reports provide input to assess the improvement platform independently. The effect of reducing the global number of accesses and ameliorating the locality is translated in a software implementation to a speed up and in a hardware design to lower power consumption. A significant side effect of the modifications is the cleaning of the code and the reduction of the code size.

The evaluation of the optimizations is based on the demo testbench (Table 8). The functionality testbench (Table 1) was designed to trigger all functionality. This (demo) testbench is configured to evaluate the efficiency of the optimized decoder on sequence with increasing complexity. Each of the sequences is encoded without data partitioning and with rate control enabled (with an infinite buffer to avoid frame skipping). Mother and Daughter is a low complexity sequence, a head and shoulders sequence. Foreman has a medium complexity and Calendar and Mobile is a high complexity sequence, with a lot of movement including rotation.

Pruning with the functionality testbench reduces the code to 40% of its original size (2.5×reduction, see Table 9). Further manual code reorganization and rewriting reduces the number of code lines to 18.4% of the original (5.4×reduction). This last reduction is obtained by flattening the hierarchical function structure and due to the memory optimizations allowing further simplification of the required functionality.

Memory Accesses and Peak Memory Requirements

The demo testbench confirms the reduction of the global number of memory accesses measured. Table 10 lists the number of accesses per frame and per second, together with the reduction factor. In a worst case, 51.9 mega transfers per second are used to decode a CIF sequence at 15 fps.

The peak memory usage tracks the maximum amount of memory allocated by the instrumented arrays during the program. It is an estimated lower bound for the actual memory usage. The block based decoder reduces the amount of memory by a factor of 18.1 to 21.7, to 60 kB for QCIF and 173 kB for CIF (Table 11). This reduction in memory footprint makes decoding of a CIF sequence on the TriMedia VLIW processor possible.

These two effects, together with the improvement of the locality of data, are the platform independent measures of the memory modifications. All of them will have an impact on the efficiency of the final, platform dependent implementation, whether it is hardware or software.

Performance

The speed improvement of the platform independent memory modifications on several platforms is measured on three different processors with a hardware-controlled cache. The number of cache hits is an important factor for the performance of such platforms. Lowering the amount of memory and the number of accesses, and improving the data locality increase the probability of cache hits. This gain comes in addition to the gain achieved by replacing the floating point IDCT by a computationally more efficient integer version. Tables 12 to 14 list the achieved frame rates and the speed up factors for both implementations (floating point and integer IDCT) on the different platforms.

The RISC processor for implementation is a HP9000/K460 180 MHz with UNIX as the operating system in the present embodiment. The PC configuration consists of a Pentium II 350 MHz running Windows NT. Philips' TriMedia TM1000 processor is a Very Long Instruction Word architecture with a clock speed of 100 MHz. The large amount of memory allocated by the FDIS code can make the TriMedia platform with 4 MB SDRAM memory crash, and the reference decoder stop and exit after some (2-3) decompressed VOPs, whereas the optimized block based code runs smoothly on substantially all platforms.

The platform independent memory modifications, with a floating point IDCT, can advantageously yield the highest performance on the PC, a speed up factor between 2.2 and 12.1. For the RISC and Trimedia processor this gain becomes respectively 2.2 to 13.3 and 3.1 to 12.7. The overall speed up factor including the integer IDCT increases between 5.9 and 23.5 for PC. This gain on RISC and TriMedia varies respectively between 5.1 to 22.4 and 4.3 to 15.1.

Comparing these rates with state-of-the-art results is not straightforward. The performance logically depends on the platform and the coding characteristics of the input sequences: the rate control method, the compressed bitrate, the quantization level etc. The global results, however, indicate achievement of the same performance without the use of platform dependent optimizations (such as e.g. MMX instructions on a PC).

Possible Architecture and Power Consumption

The main part of the power consumption in data dominated applications is due to memory. The instrumentation data together with the number of words and the width (in bits) of the used memory provides the input to calculate a simple estimation of the power consumption according to Equations 10 and 11.

$$P_{Tr} = E_{Tr} \times \frac{\# \text{ Transfers}}{\text{Second}} \quad (10)$$

$$E_{Tr} = f(\# \text{ words, } \# \text{ bits}) \quad (11)$$

Doing this calculation for each memory block yields an estimate of the total power dissipation. A tool can be used to automatically calculates these power figures when a mapping of the arrays in memories is provided. If no assignment information is provided, the tool takes, by default, a separate memory for every array. This provides a minimum for the power consumption at the cost of area.

Reducing the amount of memory size (Table 11) allows the choice of memory blocks with a lower energy per transfer. Combining this with a lower number of accesses (Table 10) results in a lower overall power consumption of the modified decoder.

A conservative assessment of the achieved power reduction is obtained by comparing the default tool power figures (a separate memory for every array) of the reference decoder with the power figures of the optimized block based decoder mapped to a possible architecture with CIF capability.

Figure 21:
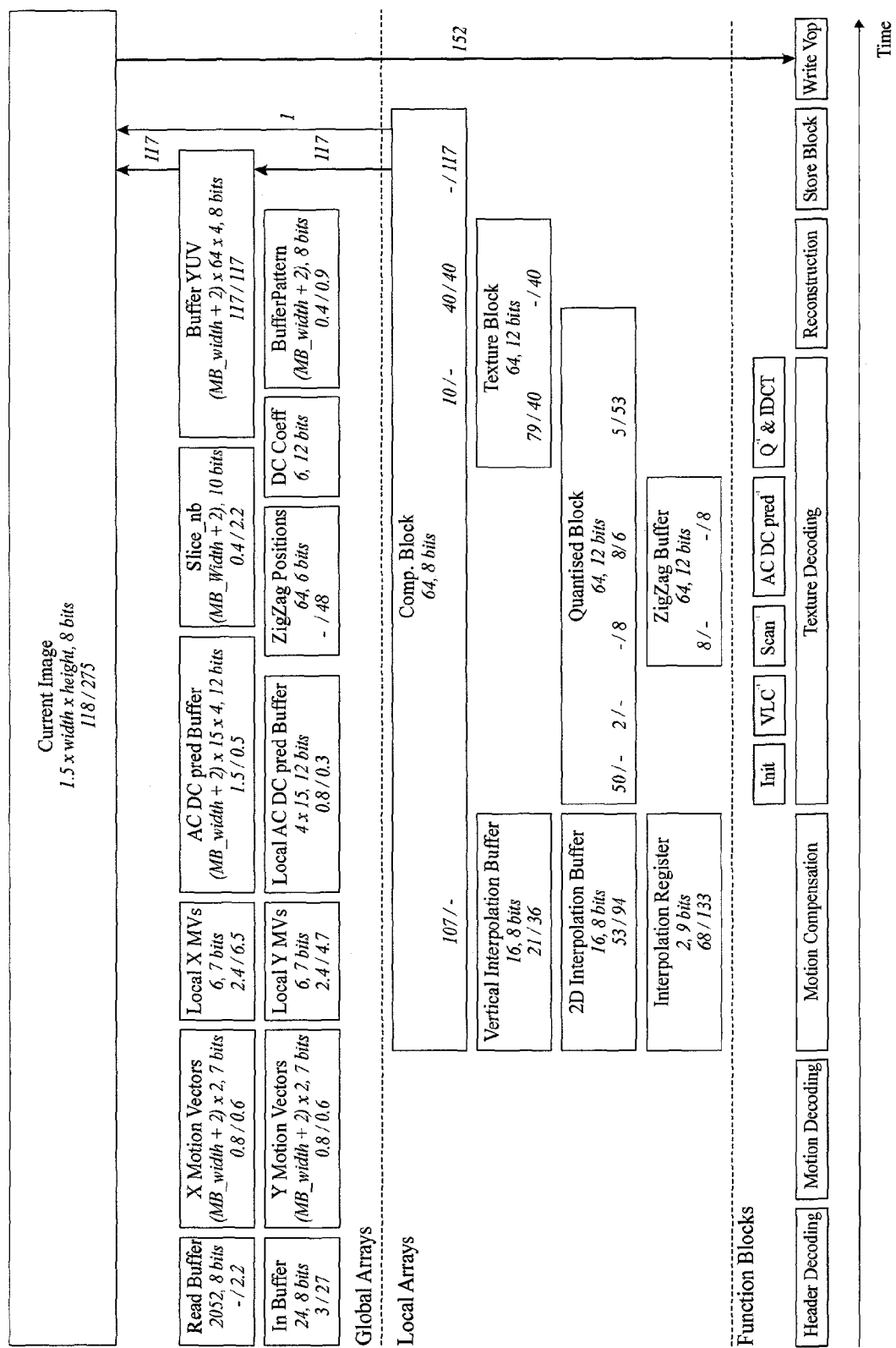
FIG. 21 is one embodiment of a detailed data flow diagram of a block based decoder.

The performance measure of Tables 12 to 14 motivate the feasibility to map the complete decoder on a single processor. The deduction of a possible memory architecture requires a detailed analysis of the most important arrays, or variables, of the video decoder. FIG. 21 summarizes the characteristics, namely the number of elements, width and number of writes/reads ($10^3$ accesses/frame) of these arrays combined with their lifetimes for the Foreman CIF 450 test case of the demonstration test bench, wherein two kinds of arrays are displayed. Local arrays are only alive during the execution of their allocating functional block. For example, the Texture Block array lives during the texture decoding and the reconstruction phase of the algorithm. Global arrays are needed during the complete decoding process. This is illustrated by the Current Image array. The arrows indicate copying from memory to memory or to disk.

In one embodiment, the memory organization contains 3 levels: main memory, cache and local buffers. Table 15 lists the selected assignment of the arrays to the chosen memories together with the theoretical width and dept. The small arrays (number of elements 16 or less) are considered to fit in the available registers. The Current Image (array of frame size) is put in main memory. Three local buffers are used for the processing of the blocks. Finally, all the remaining arrays are grouped in the caches. The use of two caches allows the storage of buffer YUV in a memory of which the width matches the pixel depth.

An estimate of the power consumption calculated by the tool for each defined memory is listed in Table 16. Three CIF sequences, with increasing complexity are considered. The effect of the improvement of locality becomes clear by comparing the power consumption of each memory block for the different sequence. The increase is largest for the smallest memories. The effect of the current optimization toward memory power is listed in Table 17. Making the conservative comparison between the reference decoder with block based decoder as explained above shows a reduction factor between 32 and 129.

Relation Access Frequency and Performance

The previous section validates the positive effect of the implemented memory optimizations on the performance of the decoder. Table 18 and Table 19 compare the access reduction factor with the obtained speed up factor on a RISC and PC platform respectively. Both code versions (pruned and block based) use an integer version IDCT to exclude the computational bottleneck of this block. The relation between the reduction factor and the speed up factor indicates the use of the decrease of the total number of array accesses as an indication of the performance improvement, which essentially eliminates the need to do an actual mapping on the platform. The correspondence is higher for CIF than for QCIF sequences as the control overhead of some of the memory optimization becomes more negligible with increasing size. The speed up factors on the PC platform can surpass those of the RISC platform.

The positive effect of the memory modifications can also be measured by calculating the speed up due to replacement of the floating point IDCT by an integer version. On the pruned (reference) code, only a modest speed up is achieved. After applying the platform independent part of DTSE, the memory bottleneck is reduced and the true improvement of lowering the computational complexity of the IDCT becomes visible (Table 20 and Table 21). This effect is again more clear on a PC platform than a RISC platform. It can be observed that the memory bottleneck is more stringent, therefore its removal results in higher speed up factors and allows freedom for lowering the computational complexity.

The MPEG-4 simple profile video decoder has a complex software specification and imposes high data transfer and storage requirements. A tool can be employed for automatic pruning, and advanced data transfer and storage analysis of this specification. The cycle counts can additionally provide the input to assess the computational complexity. The combination of the information of both tools validates the use of platform independent modifications implemented at the C-level.

The automatic pruning can be shown to reduce the code size by a factor of 2.5. This can make further manual code reorganization and rewriting feasible. The overall reduction, including the manual part, achieves a factor of 5.4. The analysis of the instrumentation of the reference software identifies the motion compensation and IDCT as implementation bottlenecks.

Modifications can be grouped in two parts. In a first phase, data flow is transformed from frame-based to macroblock-based. In a second phase, a block-based data flow is introduced. These optimizations aim at the reduction of the number of accesses and the improvement of the locality of data.

As previously discussed, the effect of the platform independent modifications is validated toward software and hardware implementation. The global number of memory accesses is reduced by a factor 5.4 to 18.6, depending on the complexity of the sequence. The peak memory usage can be reduced from some megabytes to a few kilobytes for CIF sequences. The performance measure on three platforms (RISC, PC, TriMedia) shows a consistent speed up. The most beneficial effect has bee shown to be obtained on the PC platform, where the speed up factor can vary between 5.9 and 23.5.

The effect of the memory modifications toward hardware can be assessed by calculation of the power consumption. In one embodiment, a comparison between the reference decoder and the suggested architecture indicates a power reduction between 32 and 129. The architecture of one embodiment contains a single processor and a three level memory organization. The obtained results are generic and allow a rapid evaluation of alternative memory hierarchies.

FIG. 23 is a block diagram illustrating an embodiment of a video coder comprising a video decoder. The video coder is shown in FIG. 23 as the portion surrounded by broken lines. In the exemplary embodiment, the video coder comprises a coding unit and a video decoder. The video decoder further comprises a decoding unit and a memory. The input to the video coder is a bit stream, the bit stream comprising a representation of a sequence of image data structures, wherein each image data structure comprises a group of macroblock data structures, wherein each macroblock data structure comprises a plurality of block data structures, wherein each block data structure comprises luminance or chrominance data structures. In one embodiment, each image data structure comprises a frame. When a new frame comes in, the difference between the new frame and a reconstructed previous frame is calculated. The coding unit generates a coded frame as its output by coding the difference between the new frame and the reference frame. The coding unit also sends the coded frame to the decoding unit.

In certain embodiments, the decoding unit comprises an interface, for receiving a bit stream comprising a sequence of image data structures such as frames from the coding unit, and a processing unit. The processing unit is configured to decode the coded frame from the coding unit to generate a reconstructed frame. In one embodiment, the processing unit is configured to decode a block data structure before another block data structure is decoded. The decoding unit also communicates with the memory in the decoding operation. In one embodiment, the memory is allocated for storage of pixel information and configured to store a maximum of two of the received image data structures (frames) simultaneously. The reconstructed frame from the decoding unit is then used for coding the next frame.

TABLE 1

Characteristics of the video sequences in the functionality testbench

| Test case | Number of VOPs | Rate Control | Number of coded VOPs | Bitrate (kbps) | Compression factor | Data partitioning |
|---|---|---|---|---|---|---|
| 1. Akiyo QCIF | 81 | yes | 71 | 53 | 172 | none |
| 2. Foreman QCIF 1 | 81 | none | 81 | 95 | 80 | none |
| 3. Foreman QCIF 2 | 81 | none | 81 | 96 | 79 | yes |
| 4. Foreman CIF 1 | 81 | yes | 62 | 104 | 292 | none |
| 5. Calendar and Mobile QCIF | 81 | none | 81 | 1163 | 8 | none |
| 6. Foreman CIF 2 | 81 | yes | 58 | 104 | 292 | none |
| 7. Foreman QCIF 3 | 81 | yes | 81 | 51 | 150 | yes |
| 8. Foreman CIF 3 | 101 | none | 101 | 274 | 111 | none |
| 9. Foreman CIF 4 | 101 | none | 101 | 465 | 65 | none |
| 10. Foreman CIF 5 | 101 | none | 101 | 764 | 40 | none |

TABLE 2

Motion compensation and the IDCT are the memory bottlenecks of the decoder (Foreman CIF 3 test case)

| Function name | # accesses/frame ($10^6$ accesses/frame) | Relative # accesses (%) | Relative time (%), to disk | Relative time (%), not to disk |
|---|---|---|---|---|
| VopMotionCompensate | 3.9 | 25.4 | 16.9 | 38.34 |
| BlockIDCT | 2.8 | 18.0 | 9.4 | 21.25 |
| VopTextureUpdate | 1.7 | 10.7 | 3.1 | 6.8 |
| BlockDequantization | 0.5 | 3.0 | 2.0 | 4.5 |
| CloneVop | 1.2 | 7.5 | 1.5 | 3.46 |
| VopPadding | 1.1 | 7.0 | 1.4 | 3.08 |
| WriteOutputImage | 1.0 | 6.2 | 54.9 | — |
| Subtotal | 11.6 | 74.7 | 89.1 | 77.43 |
| Total | 15.5 | 100.0 | 100.0 | 100.0 |

TABLE 3

At least 6% of the block in intra MBs and 15% of the blocks in inter MBs are not coded

| Test case | # intra MBs | # DC only blocks | Relative # DC only blocks (%) | # inter MBs | # not coded inter blocks | Relative # inter not coded blocks (%) |
|---|---|---|---|---|---|---|
| Akiyo QCIF, 53 kbps 30 fps | 99 | 220 | 37 | 2071 | 7721 | 62 |
| Foreman QCIF 1, 95 kbps 25 fps | 99 | 237 | 40 | 6318 | 26410 | 70 |
| Foreman QCIF 2, 96 kbps 25 fps | 99 | 237 | 40 | 6328 | 26448 | 70 |
| Foreman CIF 1, 104 kbps 25 fps | 450 | 1516 | 56 | 15006 | 85809 | 95 |
| Cal & Mob QCIF, 1163 kbps 30 fps | 99 | 36 | 6 | 7898 | 7304 | 15 |
| Foreman CIF 2, 104 kbps 25 fps | 448 | 1516 | 56 | 14331 | 81837 | 95 |

TABLE 3-continued

At least 6% of the block in intra MBs and 15%
of the blocks in inter MBs are not coded

| Test case | # intra MBs | # DC only blocks | Relative # DC only blocks (%) | # inter MBs | # not coded inter blocks | Relative # inter not coded blocks (%) |
|---|---|---|---|---|---|---|
| Foreman QCIF 3, 51 kbps 25 fps | 101 | 249 | 41 | 5494 | 27764 | 84 |
| Foreman CIF 3, 274 kbps 25 fps | 438 | 1329 | 51 | 29428 | 135945 | 77 |
| Foreman CIF 4, 465 kbps 25 fps | 434 | 1044 | 40 | 33672 | 134466 | 67 |
| Foreman CIF 5, 764 kbps 25 fps | 436 | 800 | 31 | 36777 | 122933 | 56 |

TABLE 4

Block IDCT, motion compensation and reconstruction
remain memory bottlenecks (Foreman CIF 3 test case)

| Function name | # accesses/ frame ($10^3$ accesses/ frame) | Relative # accesses (%) | Relative time (%), to disk | Relative time (%), not to disk |
|---|---|---|---|---|
| MBTextureUpdate | 453.4 | 11.6 | 3.1 | 11.3 |
| BlockIDCT | 405.5 | 10.4 | 6.1 | 22.7 |
| MotionCompensate | 363.6 | 9.3 | 4.5 | 16.6 |
| FillVop | 308.1 | 7.9 | 1.2 | 4.6 |
| PutBlock | 227.1 | 5.8 | 1.1 | 4.0 |
| Bzero | 199.7 | 5.1 | 0.9 | 3.2 |
| MBzero | 152.1 | 3.9 | 0.7 | 2.4 |
| BlockDequantization | 80.7 | 2.1 | 0.8 | 2.9 |
| WriteVopRaw | 152.1 | 3.9 | 73.0 | — |
| Avoid Padding | 957.5 | 24.4 | 3.3 | 12.2 |
| Subtotal | 3219.0 | 82.2 | 94.6 | 80.1 |
| Total | 3916.9 | 100.0 | 100.0 | 100.0 |

TABLE 5

Between 2.3% to 55% of the inter blocks
in the functionality testbench are not coded
and have zero motion vectors

| Test Case | Intra MBs | Inter MBs | Not Coded MBs | Not Coded inter block | % | Not coded inter block MVs 0 | % |
|---|---|---|---|---|---|---|---|
| Akiyo QCIF, 53 kbps 30 fps | 99 | 2071 | 4859 | 7721 | 62.1 | 6837 | 55.0 |
| Foreman QCIF 1, 95 kbps 25 fps | 99 | 6318 | 1602 | 26410 | 69.7 | 6273 | 16.5 |
| Foreman QCIF 2, 96 kbps 25 fps | 99 | 6328 | 1592 | 26448 | 69.7 | 14039 | 37.0 |
| Foreman CIF 1, 104 kbps 25 fps | 450 | 15006 | 9096 | 85809 | 95.3 | 2228 | 2.5 |
| Cal & Mob QCIF, 1163 kbps 30 fps | 99 | 7898 | 22 | 7304 | 15.4 | 4123 | 8.7 |
| Foreman CIF 2, 104 kbps 25 fps | 448 | 14331 | 8189 | 81837 | 95.2 | 1941 | 2.3 |
| Foreman QCIF 3, 51 kbps 25 fps | 101 | 5494 | 2424 | 27764 | 84.2 | 11766 | 35.7 |
| Foreman CIF 3, 274 kbps 25 fps | 438 | 29428 | 10130 | 135945 | 77.0 | 21899 | 12.4 |
| Foreman CIF 4, 465 kbps 25 fps | 434 | 33672 | 5890 | 134466 | 66.6 | 33726 | 16.7 |
| Foreman CIF 5, 764 kbps 25 fps | 436 | 36777 | 2783 | 122933 | 55.7 | 36919 | 16.7 |

TABLE 6

Between 0.3% and 47.7% of the inter blocks in the
demo testbench are not coded and
have zero motion vectors

| Test Case | Intra MBs | Inter MBs | Not Coded MBs | Not Coded inter block | % | Not Coded inter block MVs 0 | % |
|---|---|---|---|---|---|---|---|
| M & D QCIF 20 kbps 15 fps | 139 | 6177 | 8534 | 28188 | 76.1 | 13802 | 37.2 |
| M & D QCIF 60 kbps 30 fps | 120 | 13783 | 15797 | 55019 | 66.5 | 39457 | 47.7 |
| M & D CIF 120 kbps 30 fps | 640 | 45118 | 73042 | 211175 | 78.0 | 98022 | 36.2 |
| Foreman QCIF 50 kbps 12.5 fps | 1149 | 12077 | 1624 | 50787 | 70.1 | 7318 | 10.1 |
| Foreman QCIF 150 kbps 25 fps | 804 | 25946 | 295 | 91273 | 58.6 | 29165 | 18.7 |
| Foreman CIF 150 kbps 12.5 fps | 7312 | 45913 | 6175 | 219589 | 79.7 | 16016 | 5.8 |
| Foreman CIF 450 kbps 25 fps | 7929 | 96801 | 14070 | 394610 | 67.9 | 78427 | 13.5 |
| Cal & Mob QCIF 300 kbps 10 fps | 103 | 9795 | 2 | 10826 | 18.4 | 377 | 0.6 |
| Cal & Mob CIF 1 Mbps 10 fps | 553 | 39030 | 17 | 66009 | 28.2 | 771 | 0.3 |
| Cal & Mob CIF 2 Mbps 15 fps | 506 | 58846 | 48 | 79944 | 22.6 | 2046 | 0.6 |

TABLE 7

The motion compensation and the reconstruction are the most data intensive parts of the block based decoder (Foreman CIF 3 test case)

| Function name | # accesses/ frame (10³ accesses/ frame) | Relative # accesses (%) | Relative time (%), to disk | Relative time (%), not to disk |
|---|---|---|---|---|
| MotionCompensate | 575.4 | 39.1 | 4.6 | 38.6 |
| BufferToVop | 196.3 | 13.3 | 1.0 | 8.7 |
| BlockTextureUpdate | 175.4 | 11.9 | 1.8 | 15.2 |
| InterBlockDequantIDCT | 128.7 | 8.7 | 1.9 | 16.2 |
| VLCdecoding | 67.0 | 4.5 | 1.4 | 11.8 |
| Bzero | 27.4 | 1.9 | 0.2 | 1.3 |
| IntraBlockIDCT | 3.3 | 0.2 | 0.06 | 0.5 |
| IntraBlockdequantization | 0.9 | 0.1 | 0.01 | 0.11 |
| WriteVopRaw | 152.1 | 10.3 | 87.8 | — |
| Subtotal | 1326.5 | 90.1 | 98.9 | 92.3 |
| Total | 1472.8 | 100.0 | 100.0 | 100.0 |

TABLE 8

Characteristics of the video sequences in the demo testbench

| Test case | Number of VOPs | Frame rate | Bitrate (kbps) | Compression factor |
|---|---|---|---|---|
| 1. Mother and Daughter QCIF | 150 | 15 | 20 | 228 |
| 2. Mother and Daughter QCIF | 300 | 30 | 60 | 151 |
| 3. Mother and Daughter CIF | 300 | 30 | 123 | 296 |
| 4. Foreman QCIF | 150 | 12.5 | 50 | 76 |
| 5. Foreman QCIF | 300 | 25 | 150 | 51 |
| 6. Foreman CIF | 150 | 12.5 | 150 | 101 |
| 7. Foreman CIF | 300 | 25 | 450 | 68 |
| 8. Calendar and Mobile QCIF | 100 | 10 | 300 | 10 |
| 9. Calendar and Mobile CIF | 100 | 10 | 1000 | 12 |
| 10. Calendar and Mobile CIF | 150 | 15 | 2000 | 9 |

TABLE 9

ATOMIUM pruning reduces the code size with a factor 2.5. This allows manual code rearrangement that further reduces the code complexity

| Code version | Number of files | Number of lines | Reduction |
|---|---|---|---|
| FDIS | 93 | 52928 | — |
| Pruned | 26 | 21340 | 2.5 |
| Optimized | 19 | 9739 | 5.4 |

TABLE 10

The block based decoder reduces the global number of accesses with a factor 5.4 to 18.6

| Test Case | Version | # accesses/ frame (10³ accesses/frame) | # accesses/s (10⁶ accesses/s) | Reduction factor |
|---|---|---|---|---|
| M & D QCIF 20 kbps 15 fps | Pruned | 3428.7 | 51.4 | |
| | B_based | 189.6 | 2.8 | 18.1 |
| M & D QCIF 60 kbps 30 fps | Pruned | 3504.5 | 105.1 | |
| | B_based | 190.3 | 5.7 | 18.4 |
| M and D CIF 120 kbps 30 fps | Pruned | 12889.7 | 386.7 | |
| | B_based | 692.1 | 20.8 | 18.6 |
| Foreman QCIF 50 kbps 12.5 fps | Pruned | 4261.5 | 53.3 | |
| | B_based | 472.9 | 5.9 | 9.0 |
| Foreman QCIF 150 kbps 25 fps | Pruned | 4300.7 | 107.5 | |
| | B_based | 475.3 | 11.9 | 9.0 |
| Foreman CIF 150 kbps 12.5 fps | Pruned | 16468.6 | 205.9 | |
| | B_based | 1836.6 | 23.0 | 9.0 |
| Foreman CIF 450 kbps 25 fps | Pruned | 16455.7 | 411.4 | |
| | B_based | 1855.8 | 51.3 | 8.9 |
| Cal & Mob QCIF 300 kbps 10 fps | Pruned | 4740.6 | 47.4 | |
| | B_based | 845.0 | 8.5 | 5.6 |
| Cal & Mob CIF 1 Mbps 10 fps | Pruned | 18164.1 | 181.6 | |
| | B_based | 3145.3 | 31.5 | 5.8 |
| Cal & Mob CIF 2 Mbps 15 fps | Pruned | 18551.9 | 278.3 | |
| | B_based | 3460.7 | 51.9 | 5.4 |

TABLE 11

The block based decoder reduces the peak memory usage with a factor 18.1 to 21.7

| Test Case | Version | Peak memory usage (kB) | Reduction factor |
|---|---|---|---|
| M & D QCIF 20 kbps 15 fps | Pruned | 1305 | |
| | B_based | 60 | 21.7 |
| M & D QCIF 60 kbps 30 fps | Pruned | 1305 | |
| | B_based | 60 | 21.7 |
| M & D CIF 120 kbps 30 fps | Pruned | 3129 | |
| | B_based | 173 | 18.1 |
| Foreman QCIF 50 kbps 12.5 fps | Pruned | 1305 | |
| | B_based | 60 | 21.7 |
| Foreman QCIF 150 kbps 25 fps | Pruned | 1305 | |
| | B_based | 60 | 21.7 |
| Foreman CIF 150 kbps 12.5 fps | Pruned | 3129 | |
| | B_based | 173 | 18.1 |
| Foreman CIF 450 kbps 25 fps | Pruned | 3129 | |
| | B_based | 173 | 18.1 |
| Cal & Mob QCIF 300 kbps 10 fps | Pruned | 1305 | |
| | B_based | 60 | 21.7 |
| Cal & Mob CIF 1 Mbps 10 fps | Pruned | 3129 | |
| | B_based | 173 | 18.1 |
| Cal & Mob CIF 2 Mbps 15 fps | Pruned | 3129 | |
| | B_based | 173 | 18.1 |

TABLE 12

RISC

| Test Case | Pruned frame rate (fps) | Block based, float IDCT | Speed Up | Block based, integer IDCT | Speed Up |
|---|---|---|---|---|---|
| M & D QCIF 20 kbps 15 fps | 19.7 | 214.3 | 10.9 | 300.0 | 15.2 |
| M & D QCIF 60 kbps 30 fps | 19.0 | 157.9 | 8.3 | 375.0 | 19.8 |
| M & D CIF 120 kbps 30 fps | 4.6 | 61.2 | 13.3 | 103.4 | 22.4 |
| Foreman QCIF 50 kbps 12.5 fps | 14.2 | 75.0 | 5.3 | 136.4 | 9.6 |
| Foreman QCIF 150 kbps 25 fps | 13.8 | 60.0 | 4.4 | 125.0 | 9.1 |
| Foreman CIF 150 kbps 12.5 fps | 3.2 | 22.4 | 6.9 | 34.9 | 10.7 |
| Foreman CIF 450 kbps 25 fps | 3.3 | 18.0 | 5.5 | 33.7 | 10.3 |
| Cal & Mob QCIF 300 kbps 10 fps | 11.6 | 25.6 | 2.2 | 58.8 | 5.1 |

TABLE 12-continued

RISC

| Test Case | Pruned frame rate (fps) | Block based, float IDCT | Speed Up | Block based, integer IDCT | Speed Up |
|---|---|---|---|---|---|
| Cal & Mob CIF 1 Mbps 10 fps | 2.8 | 7.2 | 2.6 | 16.7 | 6.0 |
| Cal & Mob CIF 2 Mbps 15 fps | 2.6 | 6.4 | 2.4 | 14.4 | 5.5 |

TABLE 13

PC

| Test Case | Pruned (fps) | Block based, float IDCT | Speed Up | Block based, integer IDCT | Speed Up |
|---|---|---|---|---|---|
| M & D QCIF 20 kbps 15 fps | 28.5 | 286.5 | 10.1 | 576.9 | 20.2 |
| M & D QCIF 60 kbps 30 fps | 27.2 | 204.4 | 7.5 | 550.5 | 20.2 |
| M & D CIF 120 kbps 30 fps | 7.2 | 87.3 | 12.1 | 168.9 | 23.5 |
| Foreman QCIF 50 kbps 12.5 fps | 23.0 | 102.9 | 4.5 | 219.2 | 9.5 |
| Foreman QCIF 150 kbps 25 fps | 21.5 | 80.5 | 3.7 | 202.2 | 9.4 |
| Foreman CIF 150 kbps 12.5 fps | 6.0 | 33.3 | 5.6 | 60.5 | 10.1 |
| Foreman CIF 450 kbps 25 fps | 5.7 | 24.9 | 4.4 | 55.1 | 9.7 |
| Cal & Mob QCIF 300 kbps 10 fps | 15.2 | 32.9 | 2.2 | 91.6 | 6.0 |
| Cal & Mob CIF 1 Mbps 10 fps | 4.0 | 9.4 | 2.4 | 25.7 | 6.4 |
| Cal & Mob CIF 2 Mbps 15 fps | 3.8 | 8.4 | 2.2 | 22.3 | 5.9 |

TABLE 14

Trimedia

| Test Case | Pruned (fps) | Block based, float IDCT | Speed Up | Block based, integer IDCT | Speed Up |
|---|---|---|---|---|---|
| M & D QCIF 20 kbps 15 fps | 9.7 | 123.5 | 12.7 | 146.6 | 15.1 |
| M & D QCIF 60 kbps 30 fps | 9.4 | 103.0 | 11.0 | 132.9 | 14.2 |
| M & D CIF 120 kbps 30 fps | crash | 36.0 | — | 41.7 | — |
| Foreman QCIF 50 kbps 12.5 fps | 7.1 | 45.9 | 6.5 | 54.9 | 7.8 |
| Foreman QCIF 150 kbps 25 fps | 6.9 | 40.6 | 5.9 | 52.0 | 7.5 |
| Foreman CIF 150 kbps 12.5 fps | crash | 12.8 | — | 14.5 | — |
| Foreman CIF 450 kbps 25 fps | crash | 11.5 | — | 14.0 | — |
| Cal & Mob QCIF 300 kbps 10 fps | 5.9 | 18.6 | 3.1 | 25.6 | 4.3 |
| Cal & Mob CIF 1 Mbps 10 fps | crash | 5.3 | — | 7.1 | — |
| Cal & Mob CIF 2 Mbps 15 fps | crash | 4.6 | — | 6.3 | — |

TABLE 15

Suggested memory organization for the block based decoder

| Memory name | Theoretical memory depth CIF case | Memory width (bits) | Arrays |
|---|---|---|---|
| Main Memory | 152064 | 8 | Current Image |
| Cache1 | 9240 | 8 | Buffer YUV |
| | | | Buffer Pattern |
| Cache2 | 1830 | 12 | Read Buffer |
| | | | In Buffer |
| | | | X and Y Motion Vectors |
| | | | local X and Y MVs |
| | | | AC DC pred Buffer |
| | | | local AC DC pred Buffer |
| | | | ZigZag Positions |
| | | | Slice_nb |
| | | | DC Coeff |
| C Buffer | 64 | 8 | Comp. Block |
| T Buffer | 128 | 12 | Texture Block |
| | | | ZigZag Buffer |
| Q Buffer | 64 | 12 | Quantised Block |
| Registers | — | — | Interpolation Register |
| | | | Vertical Interpolation buffer |
| | | | 2D Interpolation Buffer |

TABLE 16

Power consumption of the different memories in relative power/frame for CIF. The increase of energy use due to a more complex sequence is bigger in small memories. The M&D column is used as reference for the ratios.

| Memory | M&D 120 kbps | Foreman 450 kbps | Ratio | Cal & Mob 2000 kbps | Ratio |
|---|---|---|---|---|---|
| Main Memory | 153.6 | 259.9 | 1.7 | 313.0 | 2.0 |
| Cache1 | 22.6 | 70.7 | 3.1 | 90.6 | 4.0 |
| Cache2 | 37.0 | 101.3 | 2.7 | 302.9 | 8.2 |
| C Buffer | 8.8 | 27.6 | 3.1 | 47.4 | 5.4 |
| T Buffer | 11.7 | 39.2 | 3.4 | 107.0 | 9.2 |
| Q Buffer | 6.7 | 29.5 | 4.4 | 59.9 | 8.9 |

TABLE 17

The block based decoder reduces the power consumption due to memory with a factor 32 to 129

| Test Case | Version | Relative Power Consumption (kilo power/s) | Reduction factor |
|---|---|---|---|
| M & D QCIF 20 kbps 15 fps | Pruned | 105.5 | |
| | B_based | 1.0 | 110 |
| M & D QCIF 60 kbps 30 fps | Pruned | 214.9 | |
| | B_based | 2.0 | 108 |
| M & D CIF 120 kbps 30 fps | Pruned | 1076.1 | |
| | B_based | 8.4 | 129 |
| Foreman QCIF 50 kbps 12.5 fps | Pruned | 105.3 | |
| | B_based | 1.8 | 60 |
| Foreman QCIF 150 kbps 25 fps | Pruned | 211.6 | |
| | B_based | 3.6 | 59 |
| Foreman CIF 150 kbps 12.5 fps | Pruned | 523.7 | |
| | B_based | 8.0 | 66 |
| Foreman CIF 450 kbps 25 fps | Pruned | 1045.5 | |
| | B_based | 16.2 | 64 |
| Cal & Mob QCIF 300 kbps 10 fps | Pruned | 89.0 | |
| | B_based | 2.8 | 32 |
| Cal & Mob CIF 1 Mbps 10 fps | Pruned | 436.9 | |
| | B_based | 12.0 | 36 |
| Cal & Mob CIF 2 Mbps 15 fps | Pruned | 659.1 | |
| | B_based | 20.5 | 32 |

TABLE 18

The reduction of the number of accesses is an indication of the performance improvement. Framerates listed for the RISC platform, using integer IDCT in both code versions

| Test Case | Version | # accesses/frame ($10^3$ accesses/frame) | Reduction factor | Decoding time/frame (ms) | Speed Up |
|---|---|---|---|---|---|
| M & D QCIF 20 kbps 15 fps | Pruned | 3428.7 | | 38.6 | |
| | B_based | 189.6 | 18.1 | 3.3 | 11.6 |
| M & D QCIF 60 kbps 30 fps | Pruned | 3504.5 | | 38.0 | |
| | B_based | 190.3 | 18.4 | 2.6 | 14.3 |
| M & D CIF 120 kbps 30 fps | Pruned | 12889.7 | | 166.7 | |
| | B_based | 692.1 | 18.6 | 9.7 | 17.2 |
| Foreman QCIF 50 kbps 12.5 fps | Pruned | 4261.5 | | 45.2 | |
| | B_based | 472.9 | 9.0 | 7.3 | 6.2 |
| Foreman QCIF 150 kbps 25 fps | Pruned | 4300.7 | | 46.7 | |
| | B_based | 475.3 | 9.0 | 8.0 | 5.8 |
| Foreman CIF 150 kbps 12.5 fps | Pruned | 16468.6 | | 200.0 | |
| | B_based | 1836.6 | 9.0 | 28.7 | 7.0 |
| Foreman CIF 450 kbps 25 fps | Pruned | 16455.7 | | 200.0 | |
| | B_based | 1855.8 | 8.9 | 29.7 | 6.7 |
| Cal & Mob QCIF 300 kbps 10 fps | Pruned | 4740.6 | | 57.1 | |
| | B_based | 845.0 | 5.6 | 17.0 | 3.4 |
| Cal & Mob CIF 1 Mbps 10 fps | Pruned | 18164.1 | | 243.9 | |
| | B_based | 3145.3 | 5.8 | 59.5 | 4.1 |
| Cal & Mob CIF 2 Mbps 15 fps | Pruned | 18551.9 | | 263.2 | |
| | B_based | 3460.7 | 5.4 | 69.4 | 3.8 |

TABLE 19

The reduction of the number of accesses is an indication of the performance improvement. Framerates listed for the RISC platform, using integer IDCT in both code versions

| Test Case | Version | # accesses/frame ($10^3$ accesses/frame) | Reduction factor | Decoding time/frame (ms) | Speed Up |
|---|---|---|---|---|---|
| M & D QCIF 20 kbps 15 fps | Pruned | 3428.7 | | 33.3 | |
| | B_based | 189.6 | 18.1 | 1.7 | 19.2 |
| M & D QCIF 60 kbps 30 fps | Pruned | 3504.5 | | 33.7 | |
| | B_based | 190.3 | 18.4 | 1.8 | 18.5 |
| M & D CIF 120 kbps 30 fps | Pruned | 12889.7 | | 131.6 | |
| | B_based | 692.1 | 18.6 | 5.9 | 22.2 |
| Foreman QCIF 50 kbps 12.5 fps | Pruned | 4261.5 | | 38.2 | |
| | B_based | 472.9 | 9.0 | 4.6 | 8.4 |
| Foreman QCIF 150 kbps 25 fbs | Pruned | 4300.7 | | 38.8 | |
| | B_based | 475.3 | 9.0 | 4.9 | 7.8 |
| Foreman CIF 150 kbps 12.5 fps | Pruned | 16468.6 | | 151.5 | |
| | B_based | 1836.6 | 9.0 | 16.5 | 9.1 |

TABLE 19-continued

The reduction of the number of accesses is an indication of the performance improvement. Framerates listed for the RISC platform, using integer IDCT in both code versions

| Test Case | Version | # accesses/frame ($10^3$ accesses/frame) | Reduction factor | Decoding time/frame (ms) | Speed Up |
|---|---|---|---|---|---|
| Foreman CIF 450 kbps 25 fps | Pruned | 16455.7 | | 153.8 | |
| | B_based | 1855.8 | 8.9 | 18.1 | 8.5 |
| Cal & Mob QCIF 300 kbps 10 fps | Pruned | 4740.6 | | 45.7 | |
| | B_based | 845.0 | 5.6 | 10.9 | 4.2 |
| Cal & Mob CIF 1 Mbps 10 fps | Pruned | 18164.1 | | 178.6 | |
| | B_based | 3145.3 | 5.8 | 38.9 | 4.6 |
| Cal & Mob CIF 2 Mbps 15 fps | Pruned | 18551.9 | | 185.2 | |
| | B_based | 3460.7 | 5.4 | 44.8 | 4.1 |

TABLE 20

Only after removing the memory bottleneck, the optimization of the computational intensive IDCT shows its true improvement. Framerates listed for the RISC platform.

| Test Case | Version | Float IDCT (fps) | Integer IDCT (fps) | Speed Up (%) |
|---|---|---|---|---|
| M & D QCIF 20 kbps 15 fps | Pruned | 19.7 | 25.9 | 31.5 |
| | B_based | 214.3 | 300.0 | 40.0 |
| M & D QCIF 60 kbps 30 fps | Pruned | 19.0 | 26.3 | 38.4 |
| | B_based | 157.9 | 375.0 | 137.5 |
| M & D CIF 120 kbps 30 fps | Pruned | 4.6 | 6.0 | 30.4 |
| | B_based | 61.2 | 103.4 | 69.0 |
| Foreman QCIF 50 kbps 12.5 fps | Pruned | 14.2 | 22.1 | 55.6 |
| | B_based | 75.0 | 136.4 | 81.9 |
| Foreman QCIF 150 kbps 25 fps | Pruned | 13.8 | 21.4 | 55.1 |
| | B_based | 60.0 | 125.0 | 108.3 |
| Foreman CIF 150 kbps 12.5 fps | Pruned | 3.2 | 5.0 | 56.3 |
| | B_based | 22.4 | 34.9 | 55.8 |
| Foreman CIF 450 kbps 25 fps | Pruned | 3.3 | 5.0 | 51.5 |
| | B_based | 18.0 | 33.7 | 87.2 |
| Cal & Mob QCIF 300 kbps 10 fps | Pruned | 11.6 | 17.5 | 50.9 |
| | B_based | 25.6 | 58.8 | 129.7 |
| Cal & Mob CIF 1 Mbps 10 fps | Pruned | 2.8 | 4.1 | 46.4 |
| | B_based | 7.2 | 16.8 | 133.3 |
| Cal & Mob CIF 2 Mbps 15 fps | Pruned | 2.6 | 3.8 | 46.2 |
| | B_based | 6.4 | 14.4 | 125 |

TABLE 21

Only after removing the memory bottleneck, the optimization of the computational intensive IDCT shows its true improvement. Framerates listed for the PC platform.

| Test Case | Version | Float IDCT (fps) | Integer IDCT (fps) | Speed Up (%) |
|---|---|---|---|---|
| M & D QCIF 20 kbps 15 fps | Pruned | 28.5 | 30.0 | 5.3 |
| | B_based | 286.5 | 576.9 | 101.4 |
| M & D QCIF 60 kbps 30 fps | Pruned | 27.2 | 29.7 | 9.2 |
| | B_based | 204.4 | 550.5 | 169.3 |
| M & D CIF 120 kbps 30 fps | Pruned | 7.2 | 7.6 | 5.5 |
| | B_based | 87.3 | 168.9 | 93.5 |
| Foreman QCIF 50 kbps 12.5 fps | Pruned | 23.0 | 26.2 | 13.9 |
| | B_based | 102.9 | 219.2 | 113.0 |
| Foreman QCIF 150 kbps 25 fps | Pruned | 21.5 | 25.8 | 20.0 |
| | B_based | 80.5 | 202.2 | 151.2 |
| Foreman CIF 150 kbps 12.5 fps | Pruned | 6.0 | 6.6 | 10.0 |
| | B_based | 33.3 | 60.5 | 81.7 |
| Foreman CIF 450 kbps 25 fps | Pruned | 5.7 | 6.5 | 14.0 |
| | B_based | 24.9 | 55.1 | 121.3 |
| Cal & Mob QCIF 300 kbps 10 fps | Pruned | 15.2 | 21.9 | 44.1 |
| | B_based | 32.9 | 91.6 | 178.4 |
| Cal & Mob CIF 1 Mbps 10 fps | Pruned | 4.0 | 5.6 | 40.0 |
| | B_based | 9.4 | 25.7 | 173.4 |
| Cal & Mob CIF 2 Mbps 15 fps | Pruned | 3.8 | 5.4 | 42.1 |
| | B_based | 8.4 | 22.3 | 165.5 |

What is claimed is:

1. A method of decoding a video bit stream, wherein the bit stream comprises a representation of a sequence of image data structures, wherein each of the image data structures comprises a group of macroblock data structures, wherein each macroblock data structure comprises a group of block data structures, wherein the block data structures comprise luminance or chrominance data structures, the method comprising:
    decoding a block data structure before another block data structure is decoded, wherein the block data structure is at least a portion of a current macroblock data structure, and wherein the macroblock data structure is at least a portion of a current image data structure.

2. The method of claim 1, wherein the decoding is performed with respect to the reference data structure, and wherein performing motion compensation comprises retrieving a related reference block and reconstructing the block data structure, wherein decoding further comprises, decoding texture information of the block data structure.

3. The method of claim 1, further comprising:
    selecting a minimal number of steps for decoding based on the retrieved additional information.

4. The method of claim 3, wherein the steps for decoding are selected from the following: decoding texture information of the block data structure, and reconstructing the block data structure.

5. The method of claim 1, further comprising allocating memory space for storage of pixel information, wherein the allocated memory space is configured to store a maximum of two image data structures simultaneously.

6. The method of claim 1, wherein the additional information comprises a motion vector.

7. The method of claim 1, wherein motion compensation is not performed when the motion vector is a zero motion vector.

8. A non-transitory computer readable medium that includes a program executing a method of decoding a video bit stream, wherein the bit stream comprises a representation of a sequence of image data structures, wherein each of the image data structures comprises a group of macroblock data structures, wherein each macroblock data structure comprises a group of block data structures, wherein the block data structures comprise luminance or chrominance data structures, wherein a portion of the data of one image data structure of the sequence is mapped within predefined similarity criteria to a portion of the data of another reference data structure of the sequence, the method comprising:

- retrieving a reference data structure;
- retrieving additional information, from at least one data header in the bit stream, regarding the similarity between the block data structure and the reference data structure; and
- decoding a block data structure before another block data structure is decoded, wherein the decoding of a block data structure comprises determining whether to perform motion compensation based at least in part on the additional information, wherein the block data structure is a portion of a current macroblock data structure, and wherein the macroblock data structure is a portion of a current image data structure.

9. The medium of claim 8, wherein the method is embodied as a computer program.

10. The medium of claim 8, wherein the additional information comprises a motion vector.

11. The medium of claim 8, wherein motion compensation is not performed when the motion vector is a zero motion vector.

12. A video decoder, comprising:
- a coding unit configured to receive a bit stream, the bit stream comprising a representation of a sequence of image data structures, wherein each image data structure comprises a group of macroblock data structures, wherein each macroblock data structure comprises a plurality of block data structures, wherein each block data structure comprises luminance or chrominance data structures;
- a processing unit, coupled to the coding unit, configured to a) retrieve a reference data structure, b) retrieve additional information, from at least one data header in the bit stream, regarding the similarity between the block data structure and the reference data structure, and c) decode a block data structure before another block data structure is decoded, wherein the decoding of a block data structure comprises determining whether to perform motion compensation based at least in part on additional information; and
- a memory, coupled to the processing unit, allocated for storage of pixel information, and configured to store a maximum of two of the received image data structures simultaneously.

13. The decoder of claim 12, wherein the additional information comprises a motion vector.

14. The decoder of claim 12, wherein motion compensation is not performed when the motion vector is a zero motion vector.

15. A video coder, comprising a decoder, the decoder comprising:
- a coding unit configured to receive a bit stream, the bit stream comprising a representation of a sequence of image data structures, wherein each image data structure comprises a group of macroblock data structures, wherein each macroblock data structure comprises a plurality of block data structures, wherein each block data structure comprises luminance or chrominance data structures;
- a processing unit, coupled to the coding unit, configured to a) retrieve a reference data structure, b) retrieve additional information, from at least one data header in the bit stream, regarding the similarity between the block data structure and the reference data structure, and c) decode a block data structure before another block data structure is decoded, wherein the decoding of a block data structure comprises determining whether to perform motion compensation based at least in part on the additional information; and
- a memory, coupled to the processing unit, allocated for storage of pixel information, and configured to store a maximum of two of the received image data structures simultaneously.

16. The coder of claim 15, wherein the additional information comprises a motion vector.

17. The coder of claim 15, wherein motion compensation is not performed when the motion vector is a zero motion vector.

* * * * *